(12) United States Patent
Amin et al.

(10) Patent No.: US 12,487,009 B2
(45) Date of Patent: Dec. 2, 2025

(54) WATER HEATER CONTROLLER AND METHODS FOR CONTROLLING WATER TEMPERATURE

(71) Applicants: Himanshu Subhash Amin, Solon, OH (US); Michael E. Giorgi, Hudson, OH (US)

(72) Inventors: Himanshu Subhash Amin, Solon, OH (US); Michael E. Giorgi, Hudson, OH (US)

( * ) Notice: Subject to any disclaimer, the term of this patent is extended or adjusted under 35 U.S.C. 154(b) by 55 days.

(21) Appl. No.: 17/005,588

(22) Filed: Aug. 28, 2020

(65) Prior Publication Data
US 2021/0123634 A1 Apr. 29, 2021

Related U.S. Application Data

(60) Provisional application No. 62/926,911, filed on Oct. 28, 2019.

(51) Int. Cl.
*F24H 15/10* (2022.01)
*F24H 9/20* (2022.01)
(Continued)

(52) U.S. Cl.
CPC ......... *F24H 15/172* (2022.01); *F24H 9/2007* (2013.01); *F24H 9/2021* (2013.01); *F24H 15/144* (2022.01); *F24H 15/156* (2022.01); *F24H 15/174* (2022.01); *F24H 15/269* (2022.01); *F24H 15/281* (2022.01); *F24H 15/421* (2022.01); *F24H 15/12* (2022.01);
(Continued)

(58) Field of Classification Search
CPC ........ F24H 15/00; F24H 15/10; F24H 15/172; F24H 15/265; F24H 15/281
See application file for complete search history.

(56) References Cited

U.S. PATENT DOCUMENTS 7,065,431 B2 * 6/2006 Patterson .............. F24H 15/486
219/490
8,550,369 B2 * 10/2013 Subramanian .......... F24H 15/20
219/490

(Continued)

FOREIGN PATENT DOCUMENTS

DE 102014204735 A1 * 9/2015 ......... F24D 19/1072
EP 2246768 A2 * 11/2010 ......... F24D 19/1066

(Continued)

*Primary Examiner* — Gregory A Wilson
(74) *Attorney, Agent, or Firm* — Amin, Turocy & Watson, LLP

(57) ABSTRACT

Techniques regarding water heating control and hot water tanks are provided herein. For example, one or more embodiments described herein can regard a device or system for water tank heating regulation. The system can comprise a processor that executes computer executable components stored in a memory. The system can also comprise a mounting component that couples the system to a thermostat of a water heater. The system can further comprise an adapter component that attaches to a temperature adjustor of the thermostat; and a configuration component of the computer executable components that, when enabled by the processor, causes the adapter component to move the temperature adjustor make a temperature change at the thermostat.

16 Claims, 19 Drawing Sheets

(51) Int. Cl.
*F24H 15/144* (2022.01)
*F24H 15/156* (2022.01)
*F24H 15/172* (2022.01)
*F24H 15/174* (2022.01)
*F24H 15/269* (2022.01)
*F24H 15/281* (2022.01)
*F24H 15/421* (2022.01)
*F24H 15/12* (2022.01)
*F24H 15/136* (2022.01)
*F24H 15/223* (2022.01)
*F24H 15/248* (2022.01)
*F24H 15/277* (2022.01)
*F24H 15/296* (2022.01)
*F24H 15/395* (2022.01)
*F24H 15/45* (2022.01)
*H04L 12/28* (2006.01)

(52) U.S. Cl.
CPC .......... *F24H 15/136* (2022.01); *F24H 15/223* (2022.01); *F24H 15/248* (2022.01); *F24H 15/277* (2022.01); *F24H 15/296* (2022.01); *F24H 15/395* (2022.01); *F24H 15/45* (2022.01); *H04L 2012/2847* (2013.01)

(56) References Cited

U.S. PATENT DOCUMENTS

| | | | | |
|---|---|---|---|---|
| 8,867,908 | B2* | 10/2014 | Brian | G05B 15/02 |
| | | | | 392/464 |
| 9,641,620 | B2* | 5/2017 | Sweeney | H04L 12/2803 |
| 9,702,585 | B2* | 7/2017 | Hayden | F24H 1/103 |
| 10,240,816 | B2* | 3/2019 | Whitehouse | F24H 15/281 |
| 10,408,495 | B2* | 9/2019 | Hardesty | F24H 1/186 |
| 10,642,239 | B2* | 5/2020 | Burke | G06Q 50/06 |
| 10,993,101 | B2* | 4/2021 | Macieira | H04W 52/0254 |
| 11,050,763 | B1* | 6/2021 | Lyle | H04L 63/126 |
| 11,287,144 | B2* | 3/2022 | Porwal | F24D 19/1048 |
| 11,300,325 | B2* | 4/2022 | Branecky | F24H 1/185 |
| 2014/0297048 | A1* | 10/2014 | Buchheit | H04L 12/282 |
| | | | | 700/282 |
| 2020/0333045 | A1* | 10/2020 | Kernich | F24H 9/45 |

FOREIGN PATENT DOCUMENTS

| | | | | |
|---|---|---|---|---|
| RU | 177023 | U1 * | 2/2018 | .......... F24H 7/0208 |
| RU | 200983 | U1 * | 11/2020 | .............. F24H 1/20 |

* cited by examiner

WATER HEATER CONTROLLER AND METHODS FOR CONTROLLING WATER TEMPERATURE

CROSS-REFERENCE TO RELATED APPLICATIONS

This application claims priority to U.S. Provisional Patent Application Ser. No. 62/926,911 filed on Oct. 28, 2019, entitled "WATER HEATER CONTROLLER AND METHODS FOR CONTROLLING WATER TEMPERATURE." The entirety of the aforementioned application is incorporated by reference herein.

TECHNICAL FIELD

This application relates to devices and techniques for water heating control and hot water tanks.

BACKGROUND

According to a Nov. 7, 2018 report by the U.S. Energy Information Administration, water heating accounts for 24% of overall energy consumption in a typical four-person American home, equivalent to 22.7 million Btu per home. Typical water heaters run on either electricity or natural gas. Though less harmful than many other fossil-fuel derivatives, natural gas consumption still contributes considerably to overall $CO_2$ emissions. While switching to an electric water heater may remove a home as a point-source of emissions, only about 17% of U.S. electricity is generated from renewable sources, according to the U.S. Energy Information Administration, so switching from a gas water heater to an electric water heater may just move the pollution upstream. Further, according to the U.S. Office of Energy Efficiency & Renewable Energy, the average American household spends apx. $400-$600 per year on water heating, much of which is spend keeping unused water at a constant, elevated temperature.

Overall energy consumption places significant strain on infrastructure, power generation entities, environment, and consumer finances. Therefore, targeting and reducing energy waste yields countless benefits. Where waste reduction and increased energy efficiency can easily occur in homes and businesses, the detrimental impacts of energy consumption can be reduced. While some improvements in water heating technology have been made, including instantaneous water heaters and water heaters that consume less energy, lose less heat to the environment, and have more efficient heating elements, there is still considerable room for increased water heating efficiency.

The above-described background relating to a water heater controller for a water heater is merely intended to provide a contextual overview of some current issues and is not intended to be exhaustive. Other contextual information may become further apparent upon review of the following detailed description.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

According to one or more embodiments, a system is described herein. The system can comprise: a processor that executes computer executable components stored in a memory. The system can include a mounting component that couples the system to a thermostat of a water heater. The system can also include an adapter component that attaches to a temperature adjustor of the thermostat and can additionally include a configuration component of the computer executable components that, when enabled by the processor, causes the adapter component to move the temperature adjustor make a temperature change at the thermostat.

In another example embodiment, a method is described herein. The method comprises: detecting, by a system comprising a processor and coupled to a hot water heater, water usage of the hot water heater, in response to the detecting, determining, by the system, patterns associated with the usage of the hot water heater, in response to the determining, generating, by the system, a heating plan associated with the patterns, and regulating, by the system, a temperature of the water based on the heating plan.

In yet another embodiment, a computer program product is described herein. The computer program product facilitates operations of a water heater controller device. The computer program product can comprise a readable storage medium having program instructions embodied therewith, the program instructions executable by a processor to cause the processor to: determine usage patterns associated with water flow through a water heater, reduce a temperature of water in the water heater during a first period of time of the usage patterns associated with water usage below a first threshold value, and increase a temperature of the water during a second period of time of the usage patterns associated with water usage above a second threshold value, wherein the second threshold value comprises a temperature greater than the first threshold value.

In some embodiments, elements described in connection with the disclosed systems can be embodied in different forms such as a computer-implemented method, a computer program product, or another form.

DESCRIPTION OF THE DRAWINGS

Various non-limiting embodiments of the subject disclosure are described with reference to the following figures, wherein like reference numerals refer to like parts throughout unless otherwise specified.

DETAILED DESCRIPTION

Figure 1A:
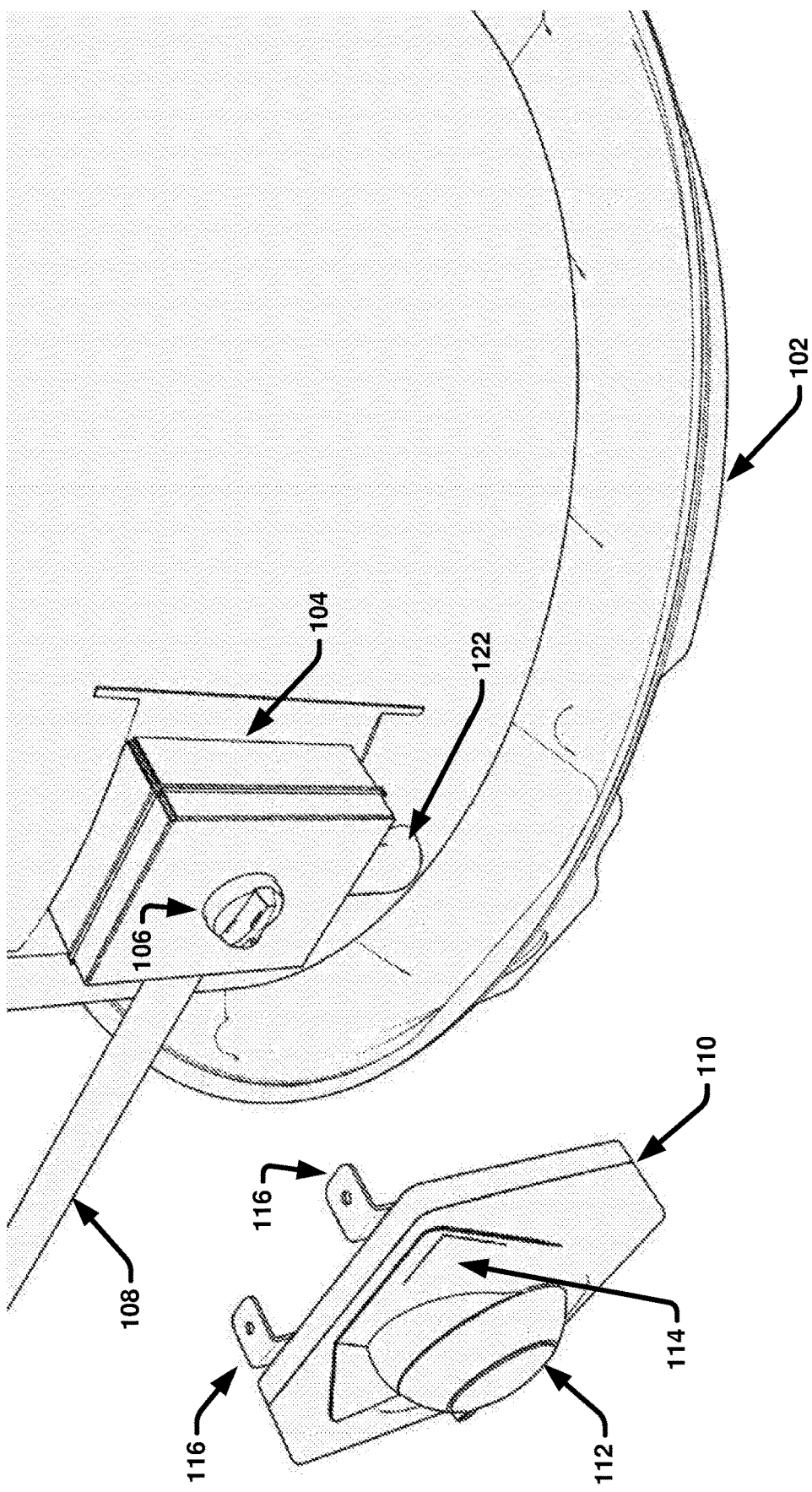
FIGS. 1A-1F are exemplary representations of a water heater controller in accordance with one or more example embodiments described herein.
Figure 1B:
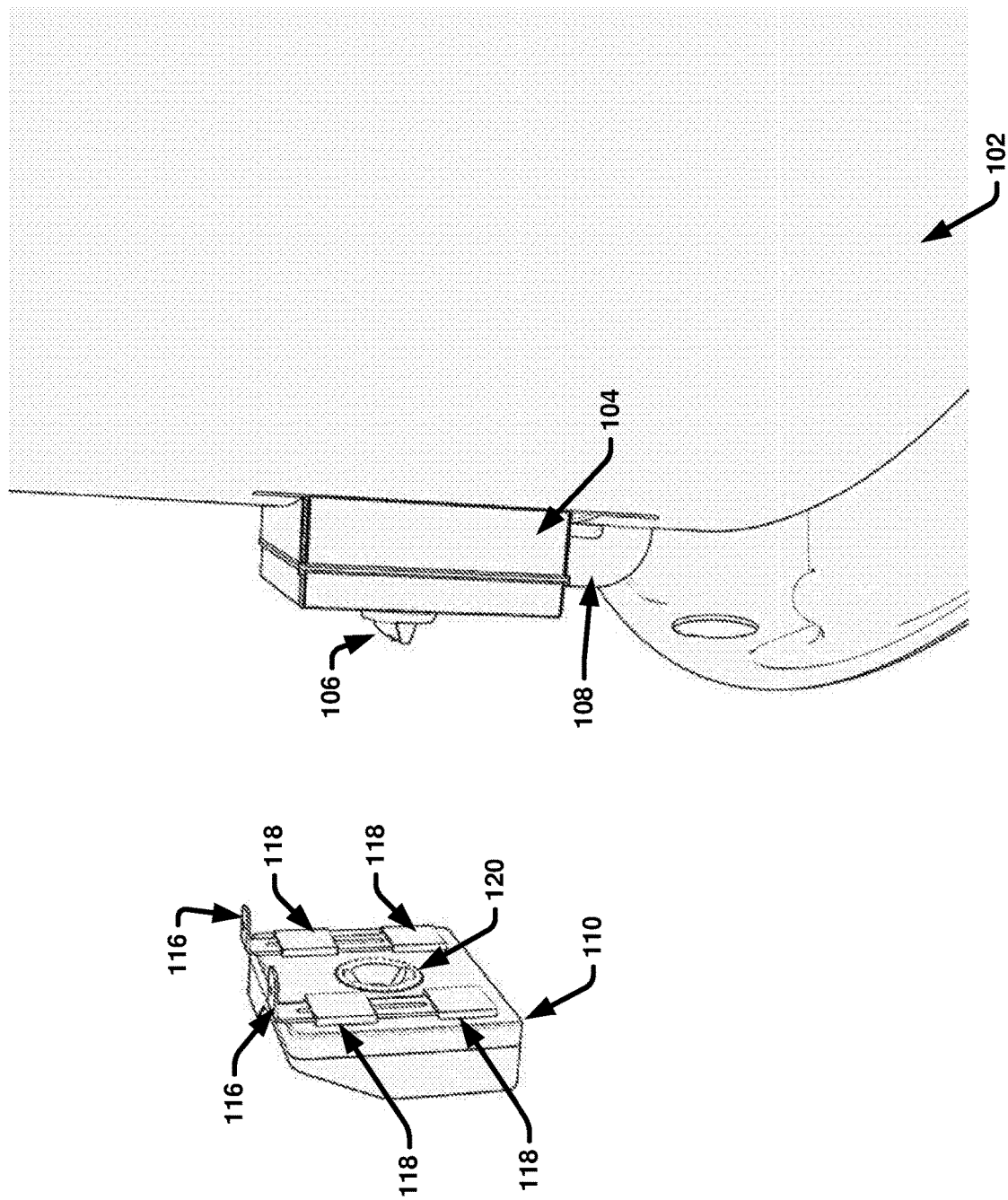
Figure 1C:
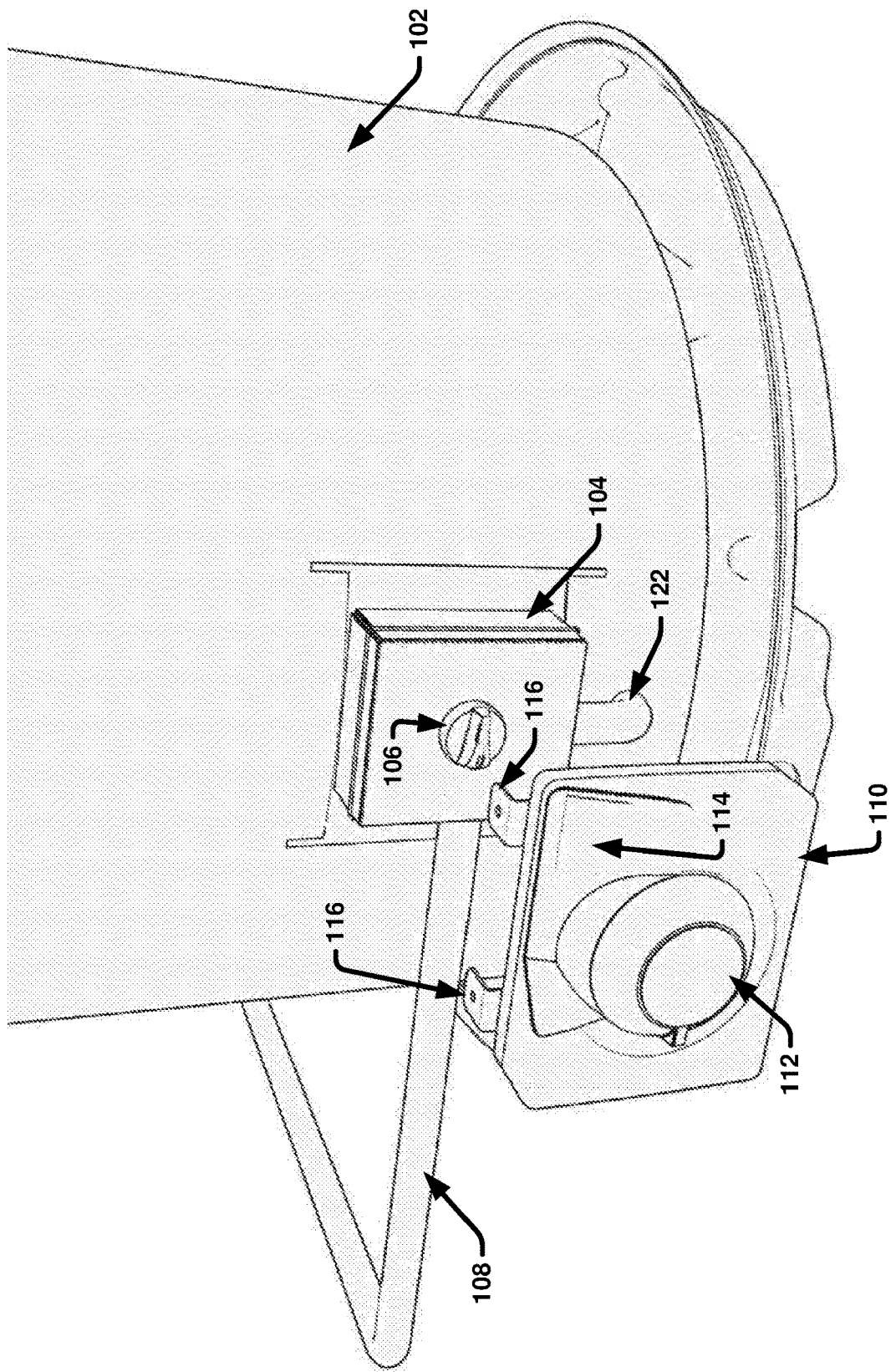
Figure 1D:
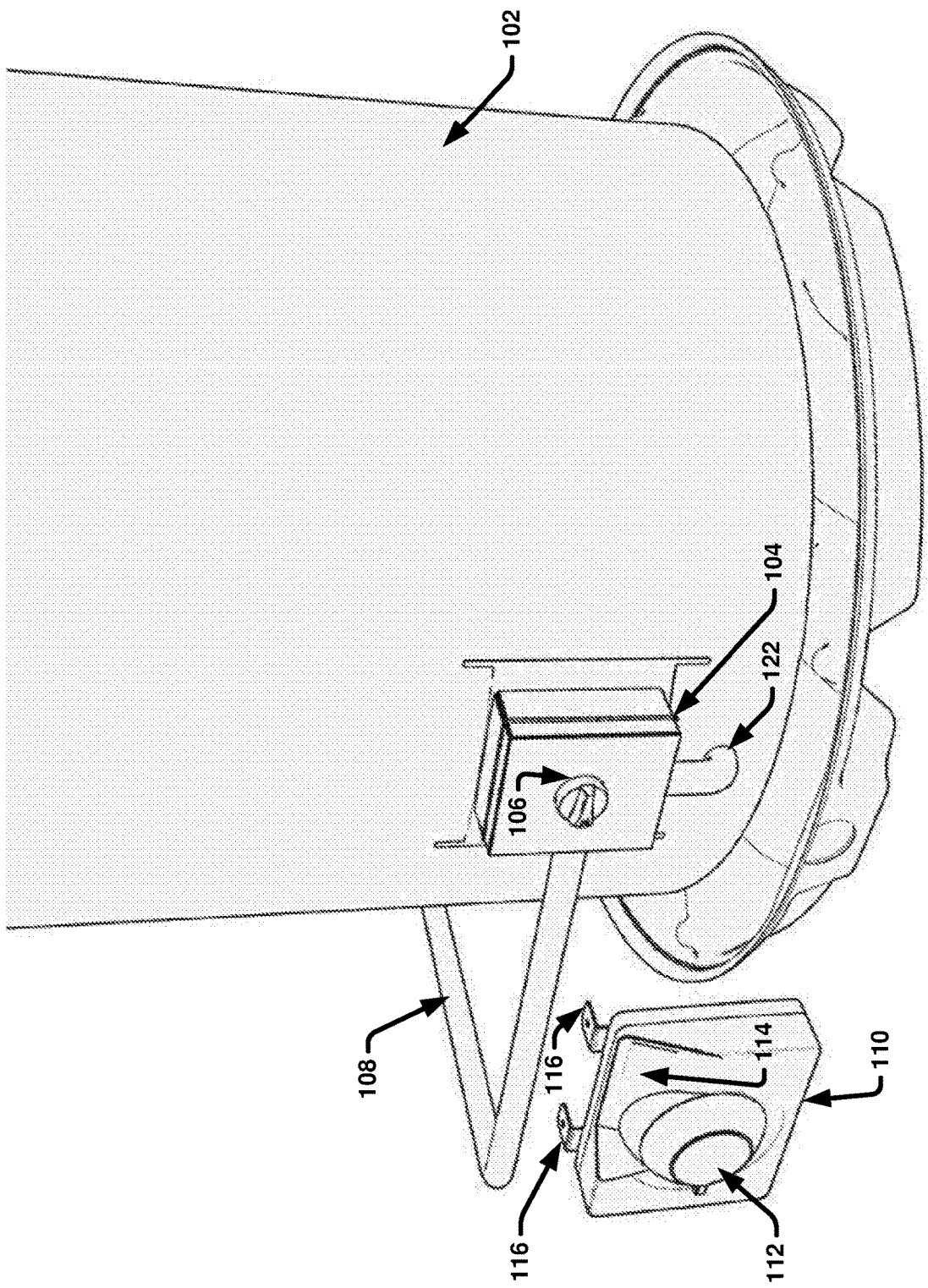

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Embodiments herein provide methods and systems that can control water temperature, for instance, of a water heater in response to a variety of conditions. Various embodiments herein enable intelligent management of water within a water heater. For example, a device can be retrofitted to an existing thermostat of a hot water heater, allowing a consumer to easily install the device without a need for professional installation. By attaching the device to the thermostat, the thermostat can be adjusted by the device. The device can make temperature adjustments, for example, according to schedule set by a user or as preset on the device.

Other various embodiments herein utilize artificial intelligence or machine learning to learn habits about use of the hot water heater to which a controller device is attached. For example, the controller device can recognize that a household uses a large volume of hot water during specific morning hours. The controller device can thereby increase the temperature of a thermostat of the hot water heater in order to ensure that the water is adequately hot and enough heater water exists to satisfy hot water demand. This can occur, for example, when several members of a family shower before leaving for work or school. The controller device can additionally recognize that hot water is not needed during specific hours of a day. According to an embodiment, the controller device can reduce the thermostat temperature during low or no-use hours in order to reduce energy consumption by the hot water heater unnecessarily keeping water hot.

Embodiments herein can be communicatively coupled to smart appliances, such as a Wi-Fi connected dishwasher or a Wi-Fi connected washing machine. Communication with such smart appliances can enable the controller device to detect use habits for such machines as well as determine the quantity of water required for each, including water required for various settings for each appliance. Additional embodiments, for instance, can communicate with a smart appliance to recognize a delayed start for said appliance. According to an example, a dishwasher can be programmed to start with a two-hour delay. The controller device can receive that information and thereby maintain water at a lower temperature until just before the dishwasher needs hot water to run.

Further embodiments can respond to conditions, such as an emergency condition. According to an embodiment, a thermostat adapter device can turn a water heater off in response to a detection of smoke, carbon monoxide, carbon dioxide, flood, leak, system error, system malfunction, etc.

Additional embodiments can enable hot water temperature adjustment in association with mobile devices, smart home systems, mobile/web applications, or other computer implementations. Such devices, systems, or applications can provide transmit and receive data to and from a temperature controller coupled to a hot water heater. Inputs can comprise temperature adjustment, enabling or disabling the hot water heater, setting a schedule, adjusting a schedule, adding or removing authorized users, etc. Outputs can comprise metrics associated with the temperature controller or users/ devices associated with the temperature controller, energy usage data, water usage data, etc.

The above aspects of the disclosure and/or other features of respective embodiments thereof are described in further detail with respect to the respective drawings below. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIGS. 1A-1F illustrate diagrams of an example, non-limiting device 110 that evaluates water consumption and adjusts water temperature in accordance with one or more embodiments of the disclosed subject matter. In accordance with various exemplary embodiments, device 110 (and other systems described herein) can be installed on a water heater thermostat 104 to enable at least the features described herein.

Device 110 can comprise a housing that can further comprise, for example, a power storage component (e.g. a battery) or a controller. The housing can be air/waterproof to protect parts/components stored within the housing. A controller contained within the device 110 which can comprise a processor and a memory. Additional components can be optionally included such as a wireless receiver/transmitter to communicate with external devices using protocols such as Wi-Fi, Bluetooth, cellular signals (e.g. 3G, 4G, 5G), radio, etc. Other embodiments regard the device 110 as a controller, comprising the above and below components described herein.

Conventional hot water heaters 102 typically include a thermostat 104 comprising temperature regulation component 106. In the case of a natural gas hot water heater 102, the thermostat 104 can regulate the amount of gas flowing from a pipe 108 to a pipe 122. Other hot water heaters 102 can use electricity to heat water. The device 110 can be adaptable to any of a natural gas hot water heater 102, electric hot water heater 102, or other type of hot water heater 102 such as propane, heating oil, wood, coal, solar, or other energy sources as would be recognized by one skilled in the art. It can be appreciated that, while the device 110 is typically used in associated with a tank-style water heater 102, the device 110 can be adapted to both tank and tankless hot water heaters 102.

Figure 1E:
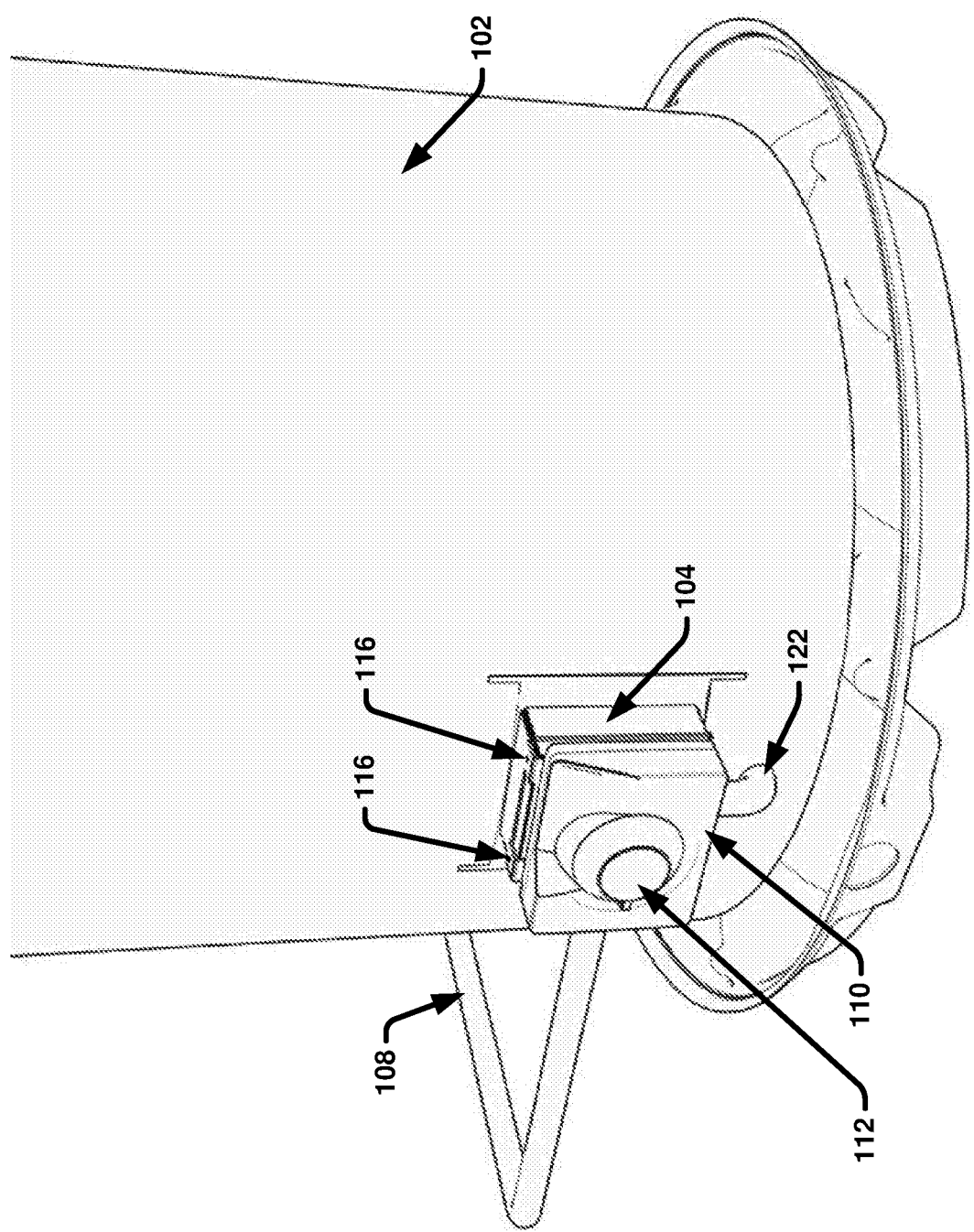
Figure 1F:
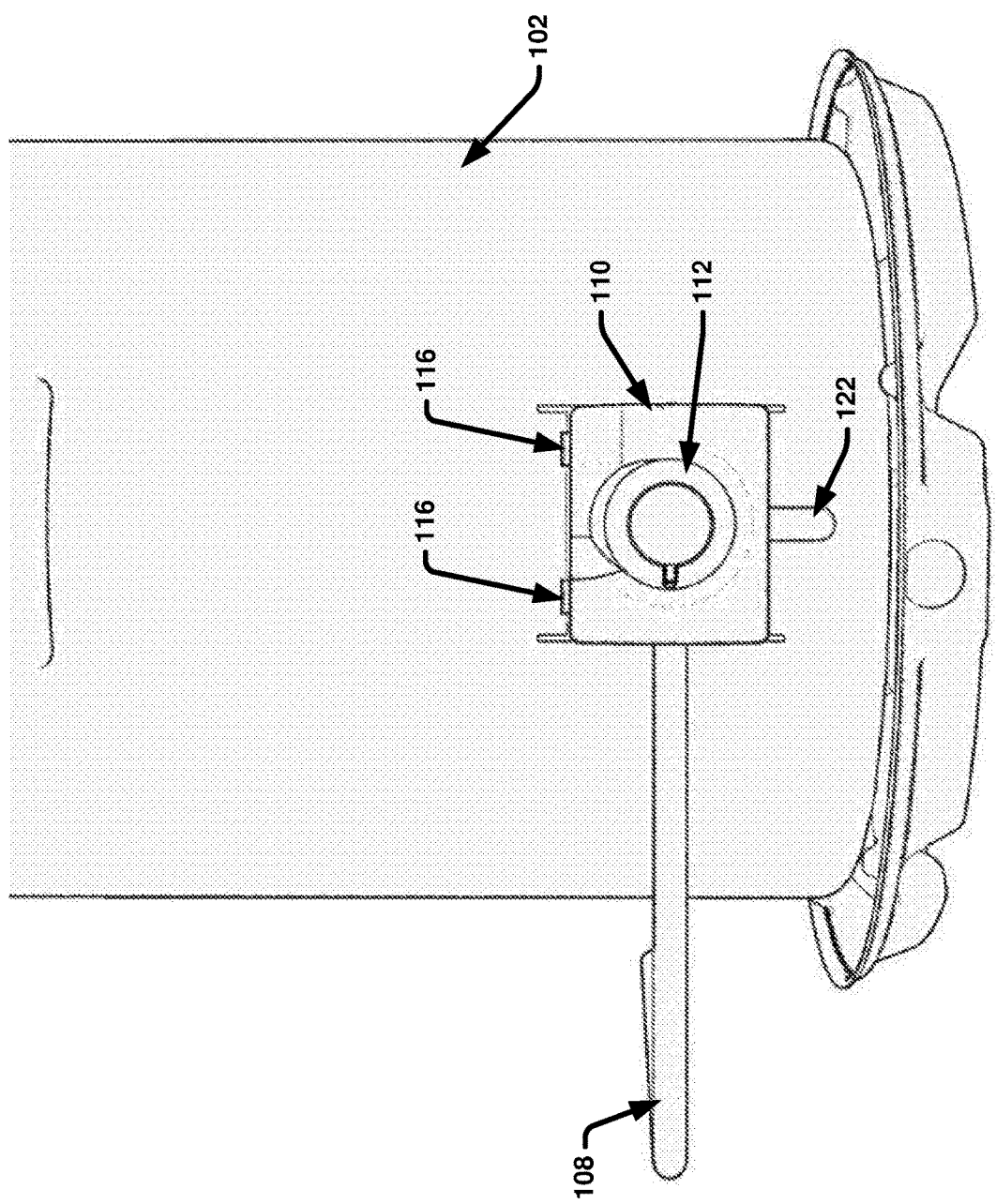

The device 110 can comprise mounting tabs 116 in order to securely mount the device 110 to a thermostat 104 or to a hot water heater 102 (or otherwise mount the device 110). FIG. 1E illustrates the attachment of the device 110 to the thermostat 104. Mounting tabs 116 can fit in channels 118 of the device 110, as can be appreciated in FIG. 1B. The channels 118 can facilitate height adjustability of the device 110. Mounting tabs 116 can comprise holes that correspond to holes of a thermostat 104 or holes can be drilled into a thermostat 104 that correspond to holes of the mounting tabs 116. Other mounting methods can be utilized such as use of adhesives, glues, bolts, screws, nails, rivets, magnets, etc.

The temperature regulation component 106 of a thermostat 104 of a conventional hot water heater 102 can comprise a rotary knob or dial whereby rotation of the rotary knob or dial adjusts the target temperature of the hot water heater 102. Other thermostats can comprise a digital temperature regulation component 106, such as a button or screen, or can comprise another type of temperature regulation component 106.

The device 110 can comprise a user interface 112. User interface 112 can be used for a variety of functions inherent to the device 110. For instance, the user interface 112 can comprise a knob 112 which can be used to manually regulate the thermostat 104 of the water heater 102 to which the device 110 is coupled, whereby rotating the knob 112 can cause the thermostat 104 to decrease water temperature of the water heater 102. According to an embodiment, turning the user interface 112 (e.g. knob 112) of the device 110 can cause an adapter component 120 of the device 110 to rotate a temperature regulation component 106 (e.g. in the case of a rotary knob or dial) of the thermostat 104, thereby adjusting the target water temperature of water within the water heater 102—e.g. see FIG. 1B. Other embodiments of the device 110 can utilize an adapter component 120 configured to interface with other types of temperature regulation components 106, such as an adapter component 120 comprising a button configured to press a button of temperature regulation component 106. Further embodiments specify removal of the temperature regulation knob 106 from the thermostat 104, thereby revealing internal temperature adjustment components of the thermostat 104. Embodiments herein can comprise an adapter component 120 configured to attach to internal temperature adjustments components of the thermostat 104.

Other embodiments use other variations of the user interface 112. For instance, user interface 112 can comprise or utilize screen(s), button(s), switch(es), knob(s), lever(s), haptic feedback, audible feedback, visual feedback, voice control, etc. According to an embodiment, the user interface 112 can display information corresponding to the device 110. Said information can include, for instance, temperature settings, operating modes, temperature schedule information, water consumption information, various metrics or statistics associated with the device 110 or users/devices associated with the device 110, etc. The user interface 112 can thereby be used to change modes, settings, or other parameters relating to the device 110.

Indentation 114 can increase usability or readability of the device 100. For instance, indentation 114 can provide a better view of the user interface 112 when viewed from above. Indentation 114 can also make it easier to grip or otherwise interact with the user interface 112 or the device 110 in general. Other embodiments utilize indentation 114 for mounting of peripheral components, such as a battery backup component configured to supply power to the device 110, thermostat 104, or hot water heater 102. It can be appreciated that the indentation 114 is optional and not required for full functionality of the device 110.

According to an embodiment, the device 110 can be configured to utilize a low temperature or vacation setting of a thermostat 104. Vacation settings of a thermostat 104 typically allow a user to reduce energy consumption by the hot water heater 102 by reducing the temperature at which the water in the tank is maintained, for instance, to approximately 50° F. to prevent water in the hot water heater 102 from freezing, until a user manually changes the hot water heater 102 back to a normal operating setting. Conventional hot water heaters 102 can often return to a desired temperature within a relatively short period of time after manually setting the temperature regulation component 106 to a desired temperature. The device 110 can utilize the vacation setting to reduce temperature during periods of time or days during which hot water is not needed. For instance, the device 110 can set the thermostat 104 to a vacation mode during periods without a demand for hot water and can return the thermostat 104 to a target temperature in response to a determined need for hot water, according to a mode or schedule, or in response to received instructions to change temperature.

According to yet another embodiment, target temperatures for a water heater 102 can vary based on a plurality of user preferences. For instance, a device 110 can receive inputs from a plurality of users regarding their respective hot-water needs. The device 110 can aggregate the inputs to create a heating plan (i.e. schedule) in order to maximize energy savings while ensuring that each user of the users has hot water according to their respective preferences (e.g. time of day, day of week, temperature of water, amount of water needed, lowest energy usage during night hours, comfortable water temperature during the bathing hours, and lowered energy usage during the daylight hours, etc.). According to an example, a user can choose to set a SLEEP mode from the hours of 10:00 PM to 5:30 AM, a DEMAND mode from 5:30 AM to 7:30 AM, and a STANDBY mode from 7:30 AM to 10:00 PM, thus increasing energy savings while not causing a user to experience a lack of hot water. Other embodiments herein can possess a plurality of modes (e.g. reactive/responsive mode, predictive mode, etc.). Specific temperatures can be set or preset for each mode of the modes. Modes can be enabled or disabled indefinitely according to user input or can be operate according to a schedule which can be set by a user, preset on a device 110, determined using machine learning, etc. The hot water heater 102 can thereby operate to regulate water temperature during the respective modes. Modes can be set, for instance, via a mobile phone application associated with the device 110 or directly at the device 110 via a user interface 112. A reactive/responsive mode can wait for user input or operate according to a schedule to make temperature changes. A predictive mode can, for example, utilize artificial intelligence in order to determine when to make temperature changes and to what temperature to change to. The aforementioned modes are purely exemplary and other modes can be used or implemented.

Other embodiments can utilize user-presence detection in order to intelligently manage hot water temperature. For instance, the device 110 can utilize data regarding a presence or absence (within a common structure or vicinity of the device 110) of a smartphone comprising a mobile application associated with the device 110. A plurality of smartphones, each associated with a user registered with the device 110, can be monitored by the device 110. In this regard, the device 110 can reduce water temperature when one, a plurality, or all registered users (by way of registered smartphones or otherwise) leave a home or area associated with the device 110. Alternatively, the device 110 can increase water temperature when one or a plurality of registered users return or enter an area or home associated with the device 110. This can be detected, for instance, by a device 110 communicating with smart locks, smart garage door openers, home security systems, smart vehicles, or other peripheral devices that can provide the device 110 with information to assist in a determination of a presence or absence of a user.

The adjustments can be as simple as a binary hot or cold setting, or the device 110 can intelligentially change temperature according to particular user preferences or information gathered by utilizing artificial intelligence or machine learning in order to determine preferences or habits associated with a user or group of users of the hot water heater 102 and associated device 110. For instance, the device 110 can synchronize with electronics calendar systems, such as an iCloud® calendar or Google calendar, to gain insight into user schedules to generate hot water heating and temperature reduction plans.

Some embodiments operate according to temperature differentials. In other words, a target temperature can remain constant, but a temperature differential may be changed, wherein, instead of setting an updated target temperature, the device 110 can set a temperature increase or reduction amount (e.g. 15° F. increase or decrease from current or target temperature). According to an example, when the hot water heater 102 operates according to temperature differentials, a temperature the hot water heater 102 is permitted to fall no lower than 15° below the set temperature. Other exemplary differentials (e.g. 30° F., 5° F., etc.) can exist depending on user preferences or device 110 configurations.

While the depicted device 110 can be retrofitted to an existing thermostat 104, other embodiments integrate the device 110 with the hot water heater 102 (i.e. hot water heater 102 manufactured with device 110 included). For instance, such embodiments can integrate the device 110 with functionality of the thermostat 104, such that a hot water heater 102 can exist without needing an additional device 110 to possess the features of the device 110. Other embodiments can allow for a remotely-located device (either device 110 or a remote communicatively coupled to the device 110, wirelessly or by wire) to allow for control over the device 110 without being in the immediate vicinity of the water heater 102. For example, a remote controller can be mounted on top-floor of a home (e.g. near a shower) while the device 110 and hot water heater 102 reside in a basement.

Figure 2:
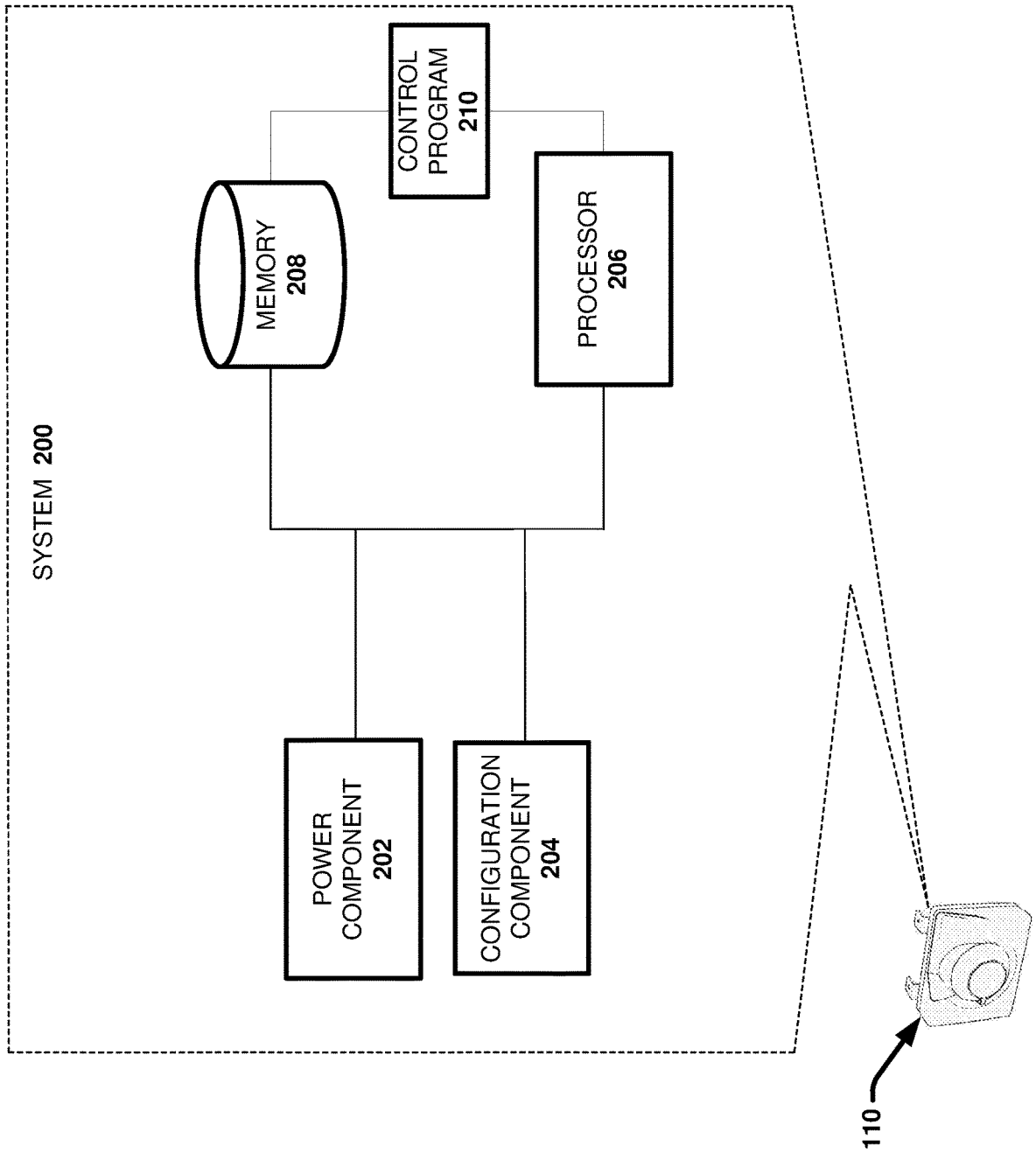
FIG. 2 is a block diagram of an example system that controls water temperature in accordance with one or more example embodiments described herein.

With reference to FIG. 2, a block diagram of a system 200 that can control water temperature is depicted. The system 200 can be, for instance, a device 110, a controller of a device 110 or a different system. The system 200 can comprise a power component 202. Power component 202 can comprise, for instance, a battery. The battery can be replaceable or can be rechargeable. According to an embodiment, the power component 202 can comprise a capacitor. In other embodiments, the power component 202 can supply power to an external device, such as a mobile device (e.g. computers, smartphones, tablets, cameras, external batteries, PDA's, etc.), thermostat 104, hot water heater 102, or any device capable of receiving a power as would be understood by one skilled in the art. In further embodiments, the power component 202 can comprise multiple components. For example, power component 202 can comprise a battery and a battery charger. Power component 202 can comprise a battery-backup system such that hot water can be maintained in the event of an electrical power outage. In the case of a gas hot water heater 102, the power component 202 can supply power to a thermostat 104 or other component such as a spark igniter, in order to enable the hot water heater 102 to maintain hot water. The battery backup system can additionally supply power to the entirety of a device 110.

The system 200 can comprise a processor 206. Processor 206 can facilitate respective analysis of information related to water temperature control. The processor 206 can analyze conditions or modify parameters based on data received and can control one or more components of the system 200.

According to an embodiment, the processor 206 can facilitate operations of a control program 210 stored on a memory 208. Control program 210 can execute a variety of functions of the system 200. For instance, the control program 210 can execute a temperature adjustment in response to an input, a program, timer, external condition, etc.

According to another embodiment, the control program 210 can interact with peripheral devices, such as a sensor or another system 200. Other embodiments utilize wireless communication protocols to facilitate communication between components and devices, as will be later discussed in greater detail. The control program 210 can cause the processor 206 to write data to the memory 208. For instance, information gathered by a sensor communicatively coupled to the system 200 can be received by the processor 206 or control program 210. The information gathered by a sensor can be stored on the memory 208, as directed by the processor 206 or the control program 210.

The control program 210 can be configured to communicate with external programs, such as a mobile application, web application, computer program, smart appliance software, vehicle software, or other software registered with the control program 210. For instance, a user can interface with a device 110 via a mobile application on a smartphone. The mobile application can cause information to be sent to/from the smartphone and the device 110. The device 110 by way of the control program 210 can allow for "smart home" system (e.g. Amazon Alexa, Google Home, Apple® HomeKit™, etc.) integration. Such integration can allow for control of the system 200 and device 110 as well as monitoring and tracking of analytics associated with water temperature.

The configuration component 204 can change or adjust various parameters of the system 200 or the device 110. The configuration component 204 can determine and apply various configuration settings of the system 200 or the device 110. For example, the configuration component can receive user preferences or other system preferences and can cause a device 110 or other device to change a temperature of a hot water heater 102 by adjusting an adapter component 120, thereby rotating a temperature regulation component 106 of a thermostat 104. For instance, a user may program, remotely or at the system 200, a schedule or a temperature change. The configuration component 204 can respond to the schedule to change configurations of the device 110 or system 200.

The configuration component 204 can adhere to a schedule which can be preset or user-configured. For instance, water temperature can be changed in response to a certain condition (e.g. time of day, day of week, etc.).

Figure 3:
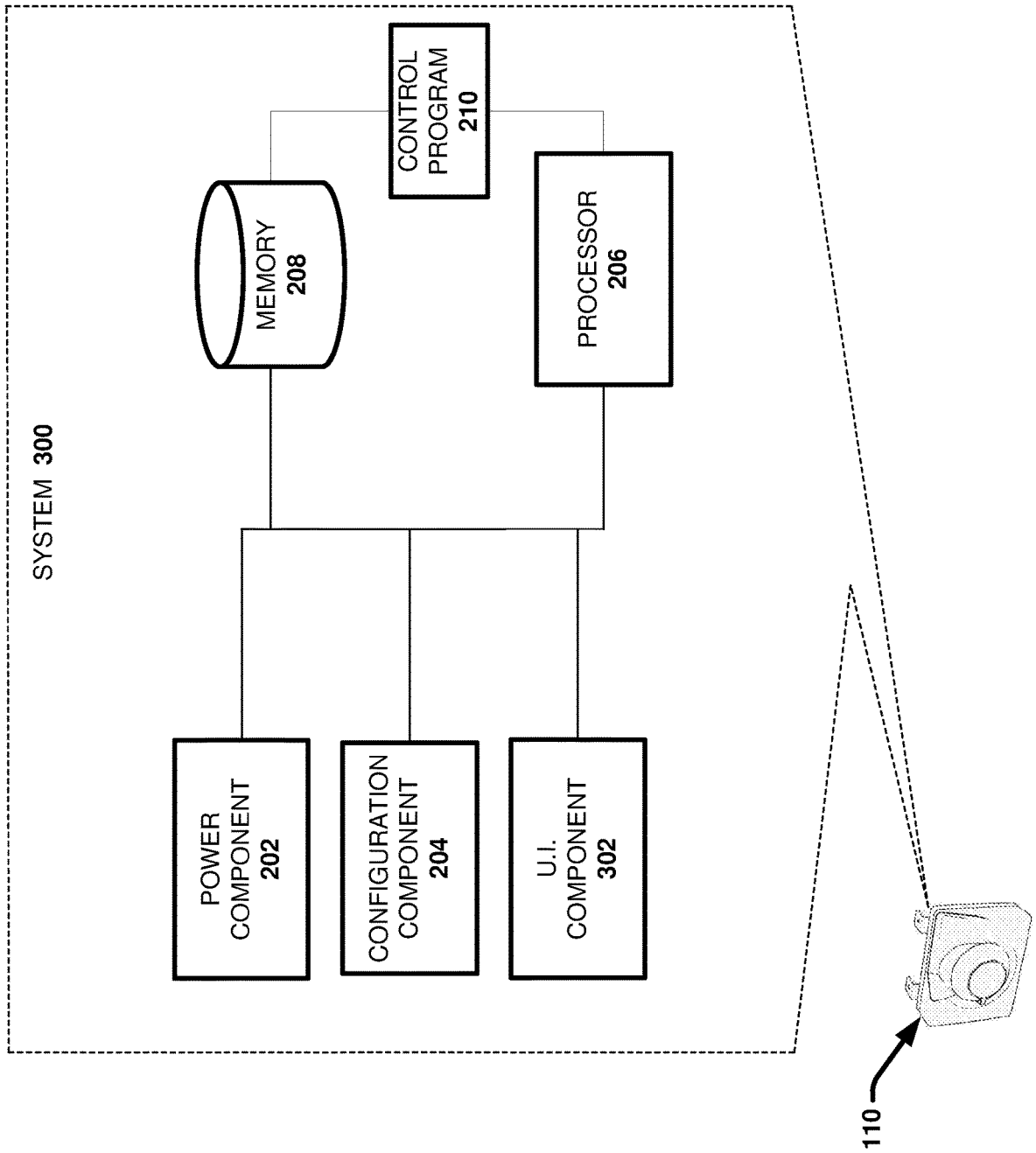
FIG. 3 is a block diagram of an example system that controls water temperature in accordance with one or more example embodiments described herein.

Turning now to FIG. 3, a block diagram of a system 300 that can control water temperature is depicted. The system 300 can be, for instance, a device 110, a controller of a device 110 as shown or a different system. The system 300 can comprise a power component 202, configuration component 204, processor 206, memory 208, control program 210, and a U.I. component 302.

U.I. component 302 can perform or facilitate a variety of user-interface functionality. For instance, U.I. component 302 can comprise screen(s), button(s), switch(es), knob(s), lever(s), haptic feedback, audible feedback, visual feedback, etc. According to an embodiment, the U.I. component 302 can display information corresponding to the system 300. Said information can include, for instance, a charge level or charge rate of a power component 202 (e.g. battery) or external device coupled to the system 300. The information displayed can include a temperature setting of a thermostat 104, user interface 112, or device 110. The U.I. component 302 can enable user-input for the system 300. For instance, the U.I. component 302 can allow a user to change a setting of the system 300, such as a temperature adjustment, schedule adjustment, setting change, etc. The U.I. component 302 can change configurations for a configuration component 204. For instance, the U.I. component 302 can comprise a knob which can be used to manually regulate water heater temperature.

According to an embodiment, the U.I. component 302 can display information corresponding to the system 300. Said information can include, for instance, temperature settings, temperature schedule information, water consumption information, various metrics or statistics associated with the system 300 or users/devices associated with the system 300, etc. The U.I. component can thereby be used to change modes, settings, or other parameters relating to system 300.

According to an embodiment, U.I. component 302 can cause the configuration component 204 to change configurations. For example, a user can interface with the U.I. component 302 which can cause the configuration component 204 to change configurations, from preconfigured configurations or user-customized configurations. Additionally, the U.I. component 302 can be utilized to retrieve, store, copy, modify, or delete data stored in a memory 208. The U.I. component 302 can operate using the control program 210 as an operating system or can otherwise operate, for instance, using its own software.

According to another embodiment, the U.I. component 302 can comprise a portal for user interface with the control program 210. For instance, the U.I. component 302 can comprise screen(s), button(s), switch(es), knob(s), lever(s) can be utilized for user-interaction with the control program 210.

Figure 4:
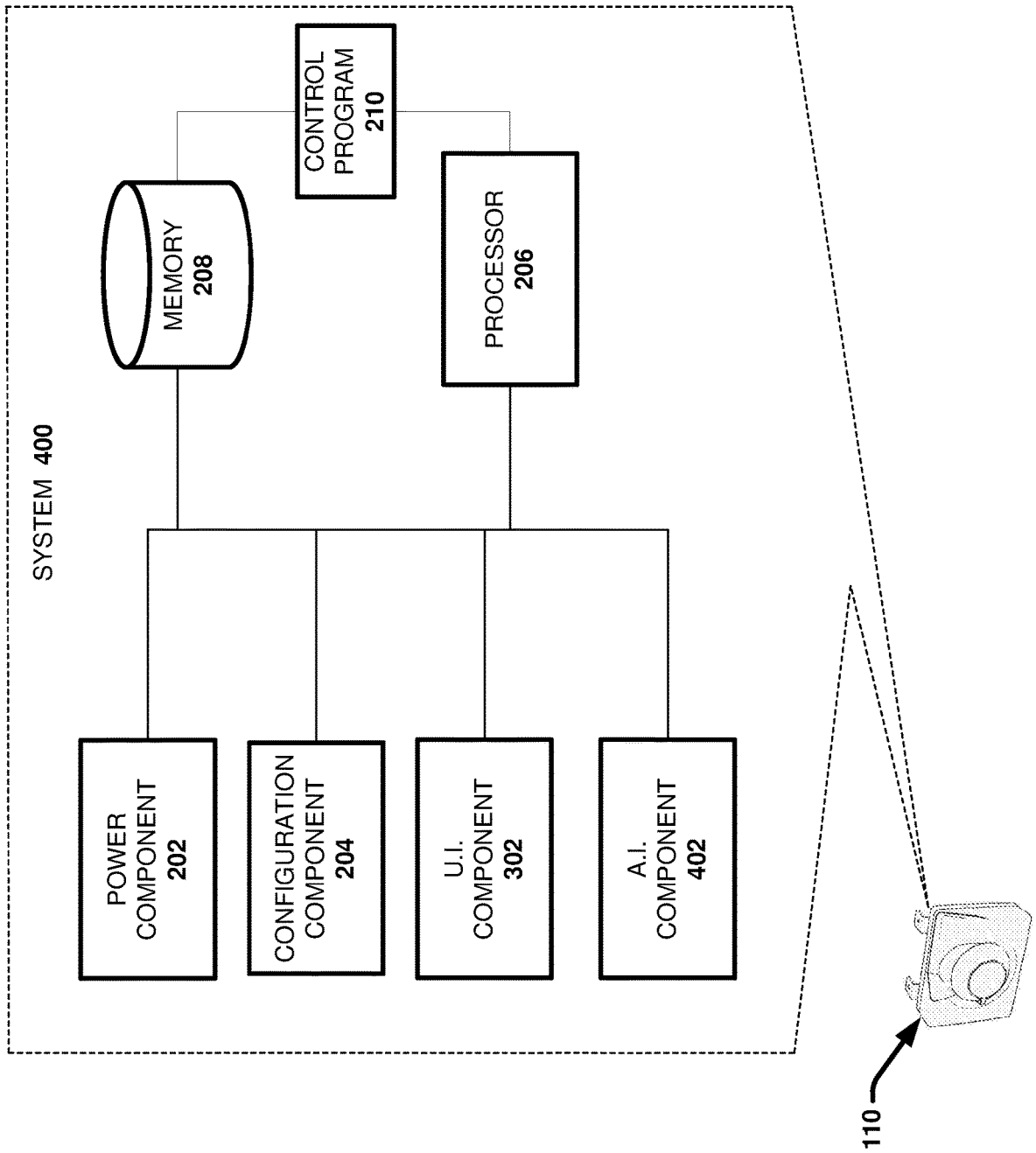
FIG. 4 is a block diagram of an example system that controls water temperature in accordance with one or more example embodiments described herein.

With reference now to FIG. 4, a block diagram of a system 400 that can control water temperature is depicted. The system 400 can be, for instance, a device 110, a controller of a device 110 as shown or a different system. The system 400 can comprise a power component 202, configuration component 204, processor 206, memory 208, control program 210, U.I. component 302, and an artificial intelligence (A.I.) component 402.

The A.I. component 402 can perform classifications, correlations, inferences and/or expressions associated with principles of artificial intelligence. For instance, the A.I. component 402 can employ an automatic classification system and/or an automatic classification. In one example, the A.I. component 402 can employ a probabilistic and/or statistical-based analysis (e.g., factoring into the analysis utilities and costs) to learn and/or generate inferences. The A.I. component 402 can employ any suitable machine-learning based techniques, statistical-based techniques and/ or probabilistic-based techniques. For example, the A.I. component 402 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the A.I. component 402 can perform a set of machine learning computations. For example, the A.I. component 402 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, or a set of different machine learning computations.

According to an embodiment, the A.I. component 402 can analyze hot water usage patterns, input patterns, or determine other analytics associated with a device 110 or another device. The A.I. component 402 can generate heating plans from gathered contextual information.

The U.I. component 302 can be utilized to adjust or change parameters of the A.I. component 402. For instance, the A.I. component 402 may exhibit an inaccuracy or may observe an outlier event (e.g. hot water tank maintenance, power outage, water shut off, etc.) that should not be used for machine learning. In response, the U.I. component 302 can enable a user to delete or ignore that information such that the A.I. component 402 does not use it for machine learning or other calculations.

Figure 5:
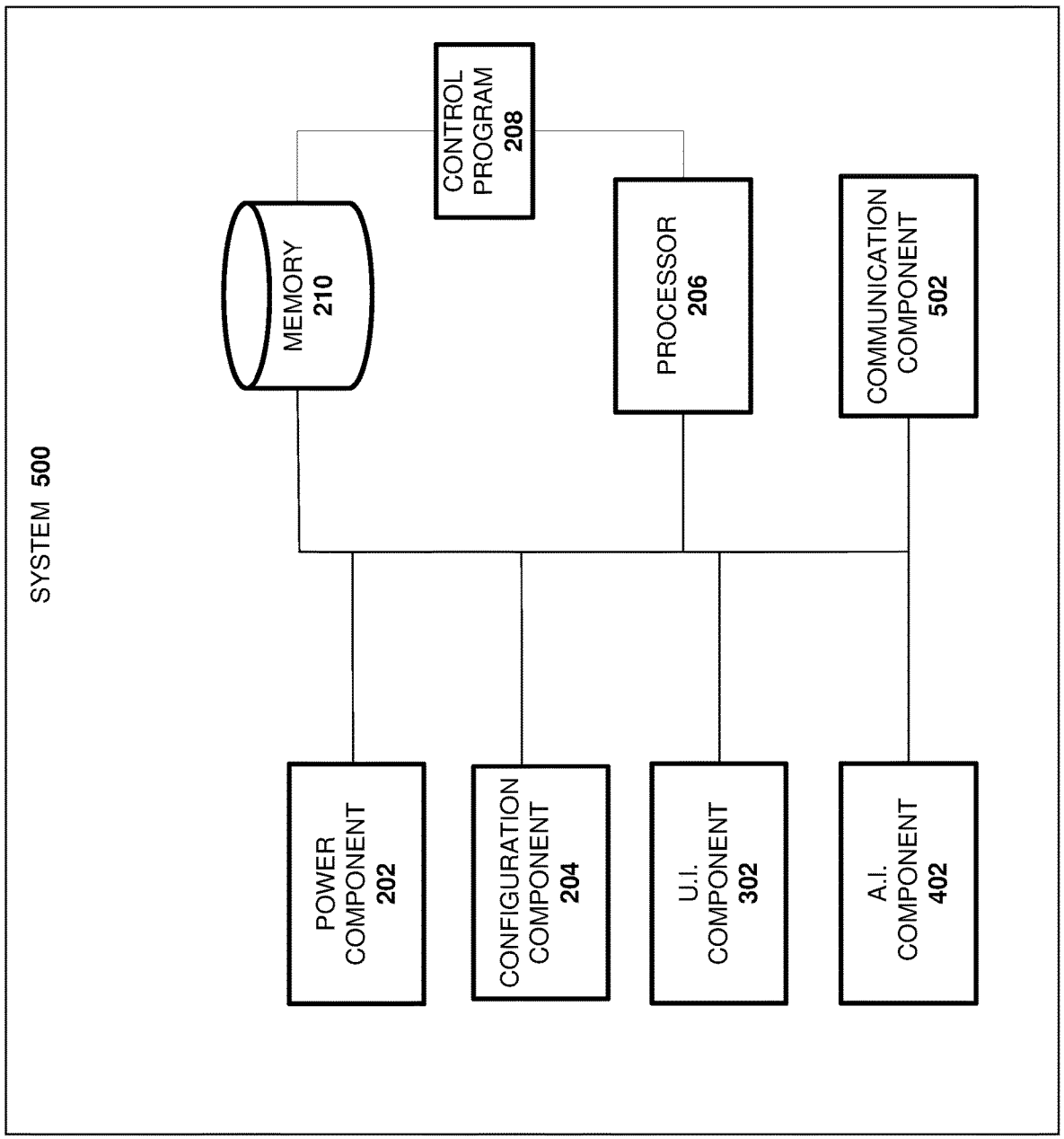
FIG. 5 is a block diagram of an example system that controls water temperature in accordance with one or more example embodiments described herein.

With reference now to FIG. 5, a block diagram of a system 500 that can control water temperature is depicted. The system 500 can be, for instance, a device 110, a controller of a device 110 as shown or a different system. The system 500 can comprise a power component 202, configuration component 204, processor 206, memory 208, control program 210, U.I. component 302, an artificial intelligence (A.I.) component 402, and a communication component 502.

The communication component 502 can facilitate or receive a variety of communications. The communication component 502 can facilitate commutations directly by wire or over the air (OTA) via different possible methods. For example, communication component 502 can communicate via IR, shortwave transmission, NFC, Bluetooth, Wi-Fi, LTE, GSM, CDMA, 2G, 3G, 4G, 5G, satellite, visual cues or radio signals among others. The communication component 502 can communicate with other devices, such as another system 500, device 110, or another device. For instance, a network of devices 110, each comprising a system 500 can aggregate data corresponding to temperature regulation. Embodiments herein enable communication between multiple of a device 110 to communicate to synchronize water heating behavior.

According to an example, a larger home may utilize multiple hot water heaters 102. A first A.I. component 402 of a first device 110 can, alone or in conjunction with a second A.I. component 402 of a second device 110, determine optional temperatures and heating periods across a plurality of associated water heaters 102, thus increasing energy efficiency.

The A.I. component 402 can use the communication component 502 in order to determine preferences or habits associated with a user or group of users. For instance, a device 110 comprising an A.I. component 402 and a communication component 502 can synchronize with electronic calendar systems, such as an iCloud® calendar or Google calendar, to gain insight into user schedules to generate hot water heating and temperature reduction plans.

Embodiments herein can leverage the communication component 502 to receive or send information. For instance, the communication component 502 can be utilized to communicate with external programs, such as a mobile application, web application, computer program, smart appliance software, vehicle software, or other software registered with the control program 210. The communication component 502 can allow for "smart home" system (e.g. Amazon Alexa, Google Home, Apple® HomeKit™, etc.) integration. Such integration can allow for control of the system 500 as well as monitoring and tracking of analytics associated with water temperature. The communication component 502 can enable the system 500 to communicate with smart locks, smart garage door openers, home security systems, smart vehicles, or other peripheral devices.

The communication component 502 can be utilized to communicate with a smartphone of a user of the system 500. This way, the communication component 502 can output information relating to the system 500, and can receive information or instructions from a smartphone, or any other device or component configured for communication with the communication component 502. For example, the communication component can receive an input comprising a modification to a heating plan. The communication component 502 can relay instructions to the configuration component 204, control program 208, or processor 206 in order to change a configuration or parameters of the system 500.

Figure 6:
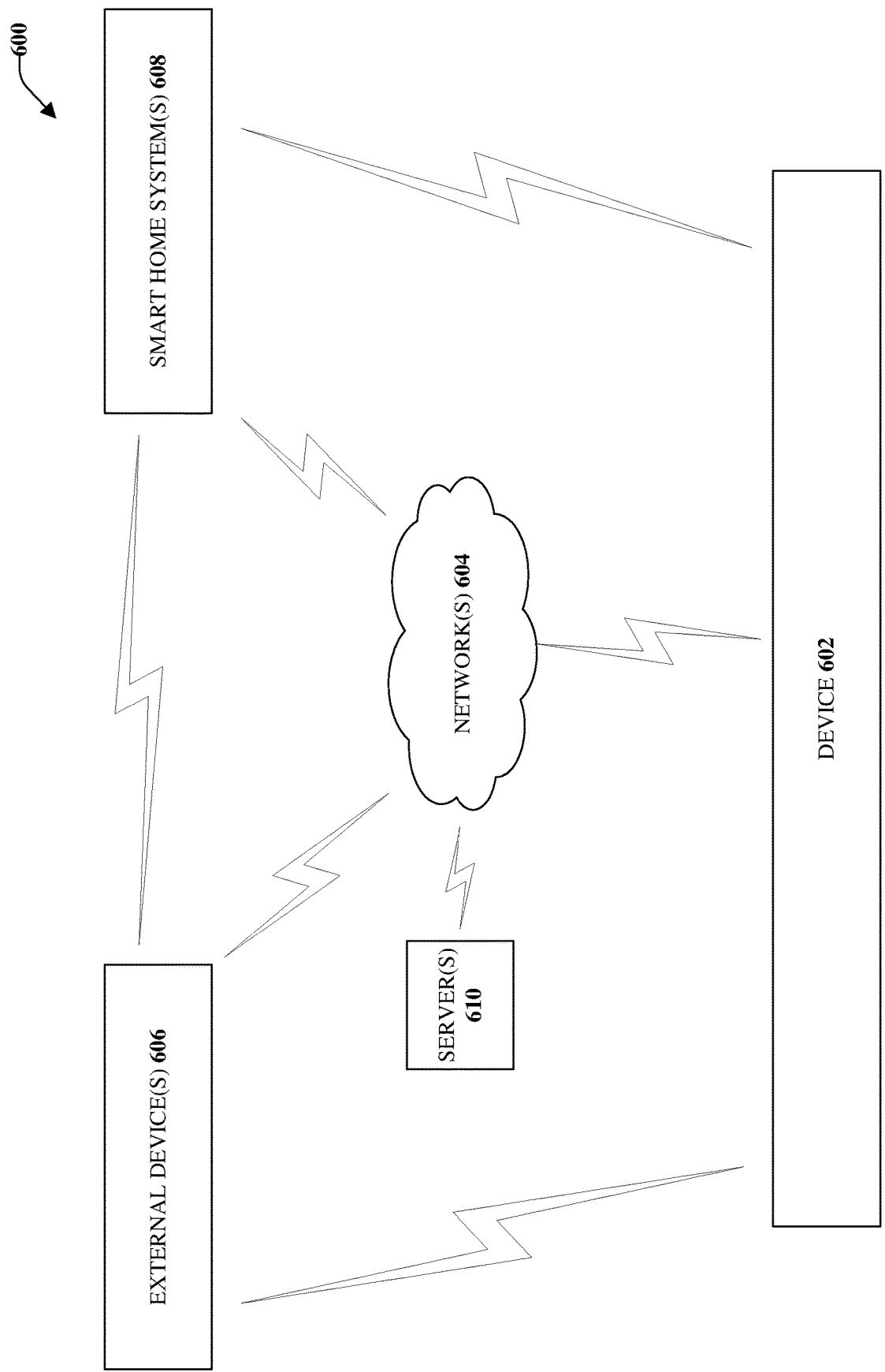
FIG. 6 is a block diagram of an example system that controls water temperature in accordance with one or more example embodiments described herein.

Turning now to FIG. 6, depicted is a diagram representative of communication between components of a system 600. System 600 can comprise a device 602, network 604, external device(s) 606, smart home system(s) 608, and server(s) 610.

A device 602 can comprise a device similar to device 110 or another device for hot water heater temperature regulation. The device 602 can comprise any one of systems 200, 300, 400, 500, etc. A network 604 can comprise, for instance, IR, shortwave transmission, NFC, Bluetooth, Wi-Fi, LTE, GSM, CDMA, 2G, 3G, 4G, 5G, satellite, visual cues or radio signals, among others. An external device 606 can comprise, for instance, computers, smartphones, tablets, cameras, PDA's, smart appliances, smart garage door openers, smart locks, smart doorbells, etc. A smart home system 608 can comprise, for instance, Amazon Alexa, Google Home, Apple® HomeKit™, Internet-connected appliance, Internet-connected plumbing fixture, etc. In a system 600, the device 602, network 604, external device(s) 606, and smart home system(s) 608 can each communicate with one another, enabling information sharing between all components (device 602, external device(s) 606, smart home system(s) 608, etc.)

According to an embodiment, network(s) 604 can comprise multiple networks. For instance, an external device 606 can comprise a smartphone utilizing a cellular (e.g. 4G, 5G, etc.) network 604 for communication, while a device 602 and smart home system 608 are connected to a home network 604 utilizing Wi-Fi. Devices, systems, and components of the system 600 operating on different network types, as in the above example, can utilize, for instance, a server 610 to send and receive data from a device using a first network and to send and receive data from a device using a second network. As in the above example, the control server 610 can receive information from a smartphone 606 operating on a 4G cellular network 604 and can communicate said information to the device 602 connected to a home network 604 utilizing Wi-Fi.

A server 610 can reside, for instance, at a remote location. According to an embodiment, the server 610 can facilitate remote backups of information stored in a device 602 (or external device 606, smart home system 608, or another device).

Figure 7:
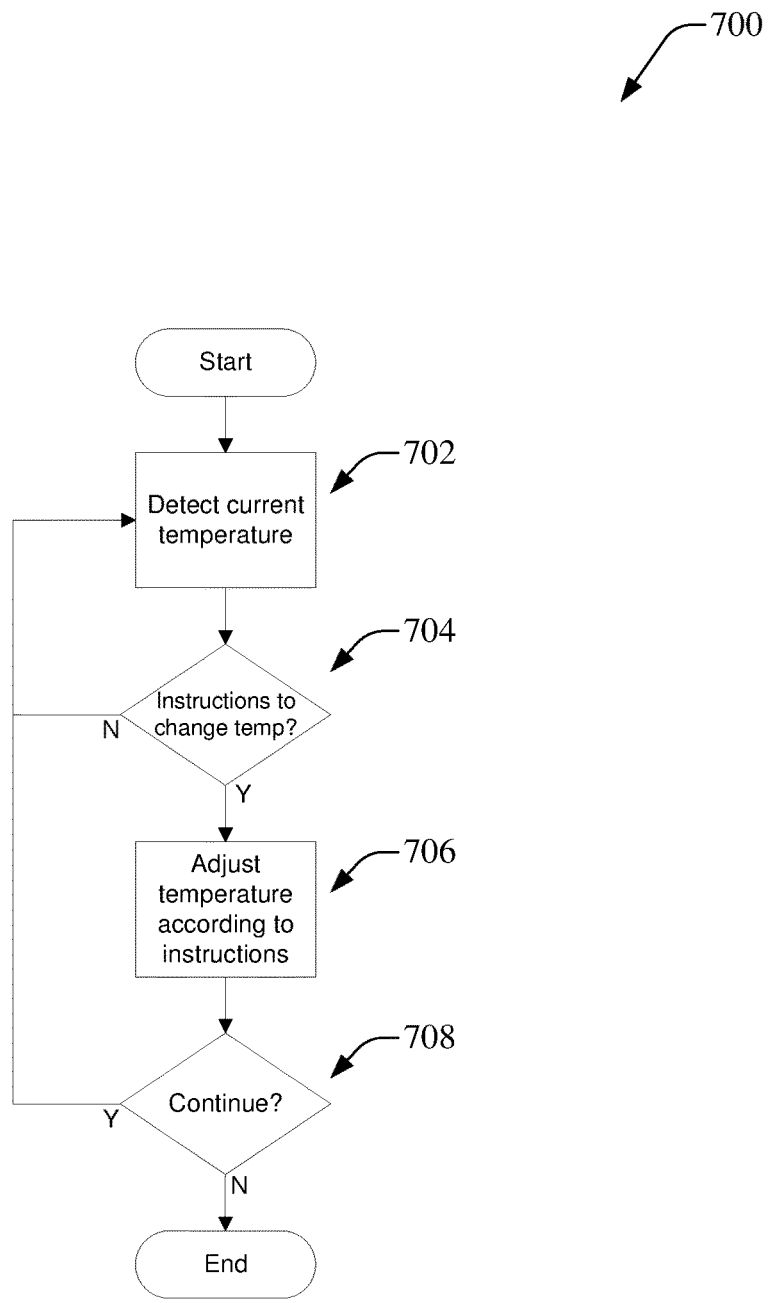
FIG. 7 is a block diagram of an example system that controls water temperature in accordance with one or more example embodiments described herein.

Referring now to FIG. 7, a flowchart of a process 700 for temperature regulation is shown. At 702, a current temperature setting of a thermostat (e.g. thermostat 104) is detected (e.g. by a device 110 or another device which can comprise any of systems 200, 300, 400, 500, 600, etc.) In other embodiments, at 702, water temperature can be detected, for instance, a sensor to detect the water temperature of a hot water tank (e.g. hot water tank 102). If at 704, instructions to change temperature are not available, the system can return to 702. If at 704 instructions to change temperature are available, the system can proceed to 706. Instructions to change temperature can come from a program, mode, physical user input, communicative user input, A.I. determination, change in presence/absence of an associated user, etc. At 706, temperature of water is adjusted according to the instructions. This can occur, for instance, by a device 110 adjusting a thermostat 104 of a water heater 102. At 708, the system can return to 702 if operation is to continue, according to a plan, the instructions, etc. At 708, if operation is to end, the process can end.

Figure 8:
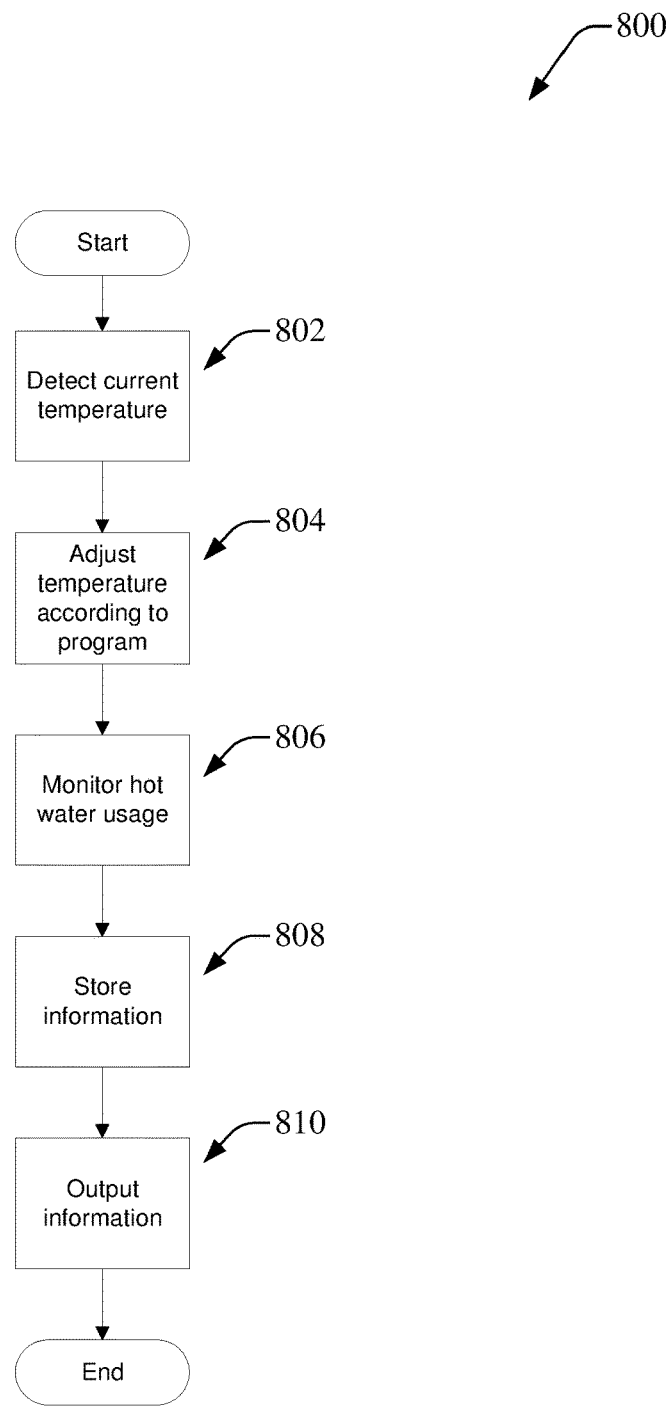
FIG. 8 is a flowchart of an example method for controlling water temperature in accordance with one or more embodiments described herein.

Turning now to FIG. 8, a flowchart of a process 800 for temperature regulation is shown. At 802, a current temperature setting of a thermostat (e.g. thermostat 104) is detected (e.g. by a device 110 or another device which can comprise any of systems 200, 300, 400, 500, 600, etc.) In other embodiments, at 802, water temperature can be detected with, for instance, a sensor to detect the water temperature of a hot water tank (e.g. hot water tank 102). At 804, a temperature adjustment is made according to a program. The program can be user-configured or can be predetermined. A program can comprise a schedule during which time periods having low water temperature and time periods having high water temperature (periods of time can be programmed for any temperature that an associated hot water heater can reach) and change temperature by monitoring time in association with the program or schedule. The program can run according to a schedule or according to learned habits. At 806, hot water usage is monitored. The monitoring can comprise holistic hot water consumption, or can comprise hot water consumption of individual users, appliances, or other fixtures sharing plumbing with an associated monitoring system. At 808, information can be stored. The information can comprise information associated the monitoring at step 806. The information can additionally or alternatively comprise other information, such as information received from appliances, fixtures, smartphones, mobile applications, web applications, smart home devices, manually input information, etc. The information can be stored, for instance to a memory 208 or to a different state storage, either internal to an associated system or can be stored externally, such as on an external memory (e.g. SD, microSD, flash drive, external hard drive, server etc.). At 810, information can be output to recipients registered to receive the information. The information can comprise, for instance, the information from the monitoring at step 806, the information stored at step 808, or other information associated with an associated device or system (e.g. device 110). After outputting the information, the process 800 can end.

Figure 9:
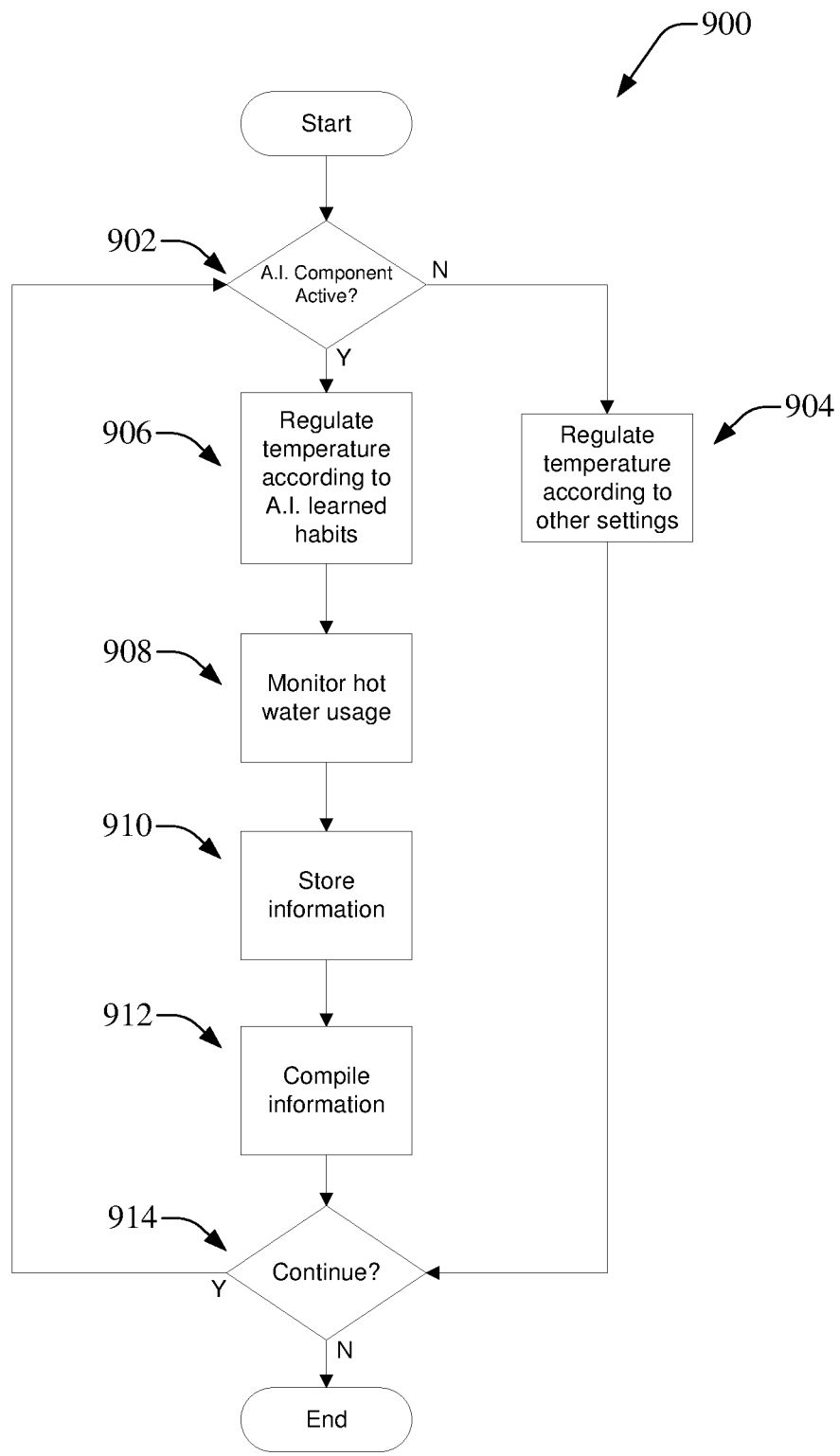
FIG. 9 is a flowchart of an example method for controlling water temperature in accordance with one or more embodiments described herein.

Referring now to FIG. 9, a flowchart of a process 900 for temperature regulation is shown. At 902, an initial check regarding whether an A.I. component (e.g. A.I. component 402) as active. An active A.I. component can correspond to an A.I. setting of a device 110 (or system 200, 300, 400, 500, 600, etc.) being enabled or can correspond to whether a device (e.g. device 110) comprises an A.I. component at all or otherwise possess A.I. functionality. If an A.I. component is not active, the system can proceed to 904. At 904, temperature of a hot water heater (e.g. hot water heater 102) can be regulated according to other settings (i.e. non-A.I. related settings such as a time or usage-based program, or a program that response to a condition with a specified response such as enabling a hot water heater in response to a user entering a home). Such settings can additionally comprise manual user adjustment, a program, timer, mode, etc. If at 902, an A.I. component is active, the process can proceed to 906. At 906, water temperature is regulated according to A.I. learned habits, such as individual user habits or preferences regarding temperature, time of usage, day of usage, duration of usage, type of appliance used, type of fixture used, etc. At 908, hot water usage can be monitored. The monitoring can comprise holistic hot water consumption, or can comprise hot water consumption of individual users, appliances, or other fixtures sharing plumbing with an associated monitoring system. At 910, information can be stored. The information can comprise information associated the monitoring at step 908. The information can additionally or alternatively comprise other information, such as information received from appliances, fixtures, smartphones, mobile applications, web applications, smart home devices, manually input information, etc. The information can be stored, for instance to a memory 208 or to a different state storage, either internal to an associated system or can be stored externally, such as on an external memory (e.g. SD, microSD, flash drive, external hard drive, server etc.). At 912, information can be compiled. The compiling can comprise organizing monitored or stored information according to various parameters, for instance, by user, number of users present, appliance, fixture type, time of day, day of week, week of month, month of year, etc. At 914, the system can return to 902 if operation is to continue, according to a plan, the instructions, etc. At 914, if operation is to end, the process can end.

Figure 10:
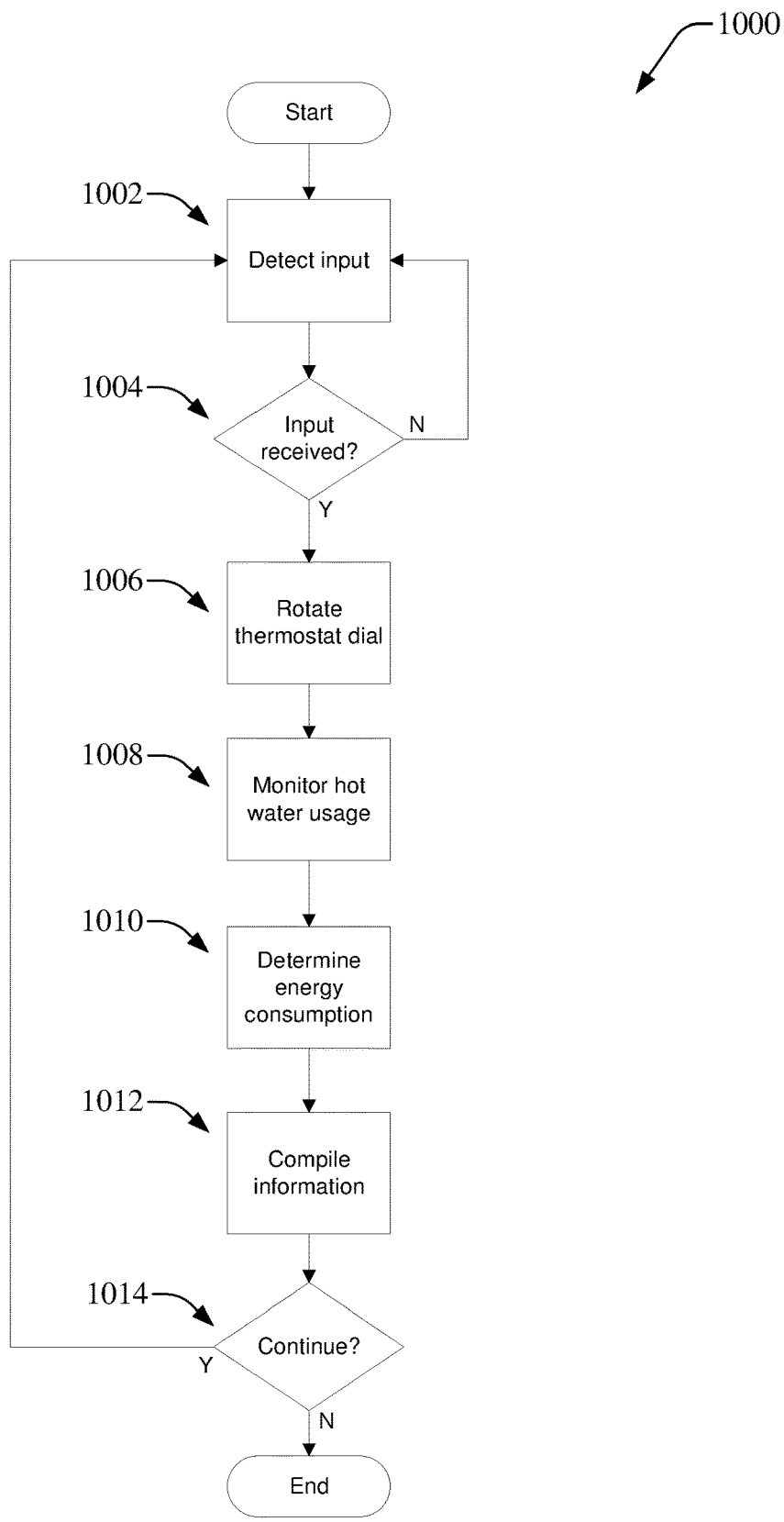
FIG. 10 is a flowchart of an example method for controlling water temperature in accordance with one or more embodiments described herein.

With reference now to FIG. 10 a flowchart of a process 1000 for temperature regulation is shown. At 1002, an input can be detected by a device. The device can comprise for instance, a device 110, system 200, 300, 400, 500, 600, or other system capable of executing the process 1000. The input at step 1002 can comprise an input by a user received at a U.I. component (e.g. U.I. component 302 or user interface 112) such as a rotation of a user interface 112, an input received by a communication component 502 (e.g. from a mobile device such as a smartphone, smart home device, a smart appliance such as a smart dishwasher, smart washing machine, smart refrigerator, etc.), a sensor coupled to a hot water controller (e.g. temperature sensor), etc. If an input is not detected, the process at 1004 can return to 1002 to continue detecting for an input. If an input has been detected, the system at 1004 can proceed to step 1006. At 1006, an input corresponding to a temperature change request can be executed. For instance, a temperature adjustment component (e.g. a thermostat dial) can be rotated in order to adjust a temperature of water within a hot water heater 102. The knob rotation can correspond to the desired temperature of the input, and a device, such as a device 110 calibrated to interface with the knob can precisely adjust the thermostat to the desired temperature. Other embodiments can alternatively comprise inputs that can adjust temperature, such as by manipulation of a button, switch of a thermostat, or hot water heater. At 1008, hot water usage can be monitored. The monitoring can comprise holistic hot water consumption, or can comprise hot water consumption of individual users, appliances, or other fixtures sharing plumbing with an associated monitoring system. Monitoring can be accomplished, for instance, by integrating a water level sensor inherent to a hot water heater with a control device (e.g. device 110), by a sensor inherent to a controller device (e.g. device 110), or a sensor coupled to the controller device and installed at the hot water heater or plumbing associated with the hot water heater. At 1010, energy consumption associated with hot water usage can be determined. For instance, a device, such as a device 110, can have access to utility pricing and associate pricing information (e.g. electricity price, natural gas price, etc.) with the amount of a particular resource consumed (electricity, natural gas, etc.) The pricing information can be set by a user or can be, for instance, gathered from the internet. According to an embodiment, standard pricing corresponding to an area can be utilized. Other embodiments enable a temperature regulation device, such as a device 110, to be authorized to link to an online account associated a utility company that supplies a resource consumed by the hot water heater (e.g. natural gas). For example, a device 110 can be linked to a natural gas account associated with the natural gas powering a coupled hot water heater (e.g. hot water heater 102) and can gather pricing information from that online account. Additional information such as usage can be determined to supplement energy consumption information or assist in other functions such as machine learning or accuracy verification. The energy consumption determination can comprise holistic energy consumption, or can comprise energy consumption of individual users, appliances, or other fixtures sharing plumbing an associated system. At 1012, information can be compiled. The compiling can comprise organizing monitored or stored information according to various parameters, for instance, by user, number of users present, appliance, fixture type, time of day, day of week, week of month, month of year, etc. At 1014, the system can return to 1002 if operation is to continue, according to a plan, the instructions, etc. At 1014, if operation is to end, the process 1000 can end.

Figure 11:
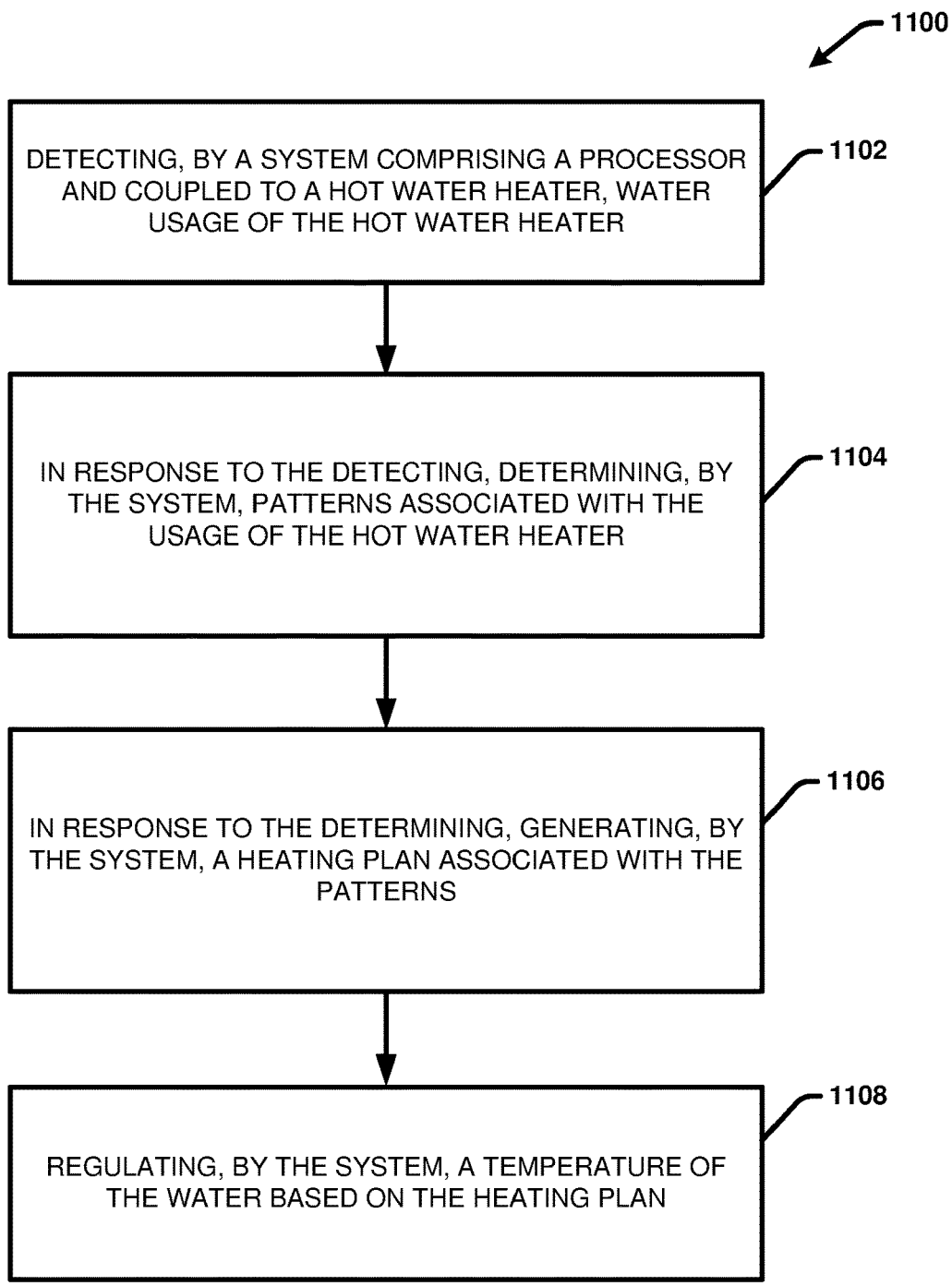
FIG. 11 is a block flow diagram for a process for a system that controls water temperature in accordance with one or more embodiments described herein.

Referring now to FIG. 11, a block flow diagram for a process for a system that regulates water temperature in accordance with one or more example embodiments is shown. At 1102, a system comprising a processor and coupled to a hot water heater can detect water heater usage of the hot water heater. At 1104, the system can, in response to the detecting, determine patterns associated with the usage of the hot water heater. At 1106, the system can, in response to determining the patterns, generate a heating plan associated with the patterns. At 1108, the system can regulate a temperature of the water based on the heating plan.

Figure 12:
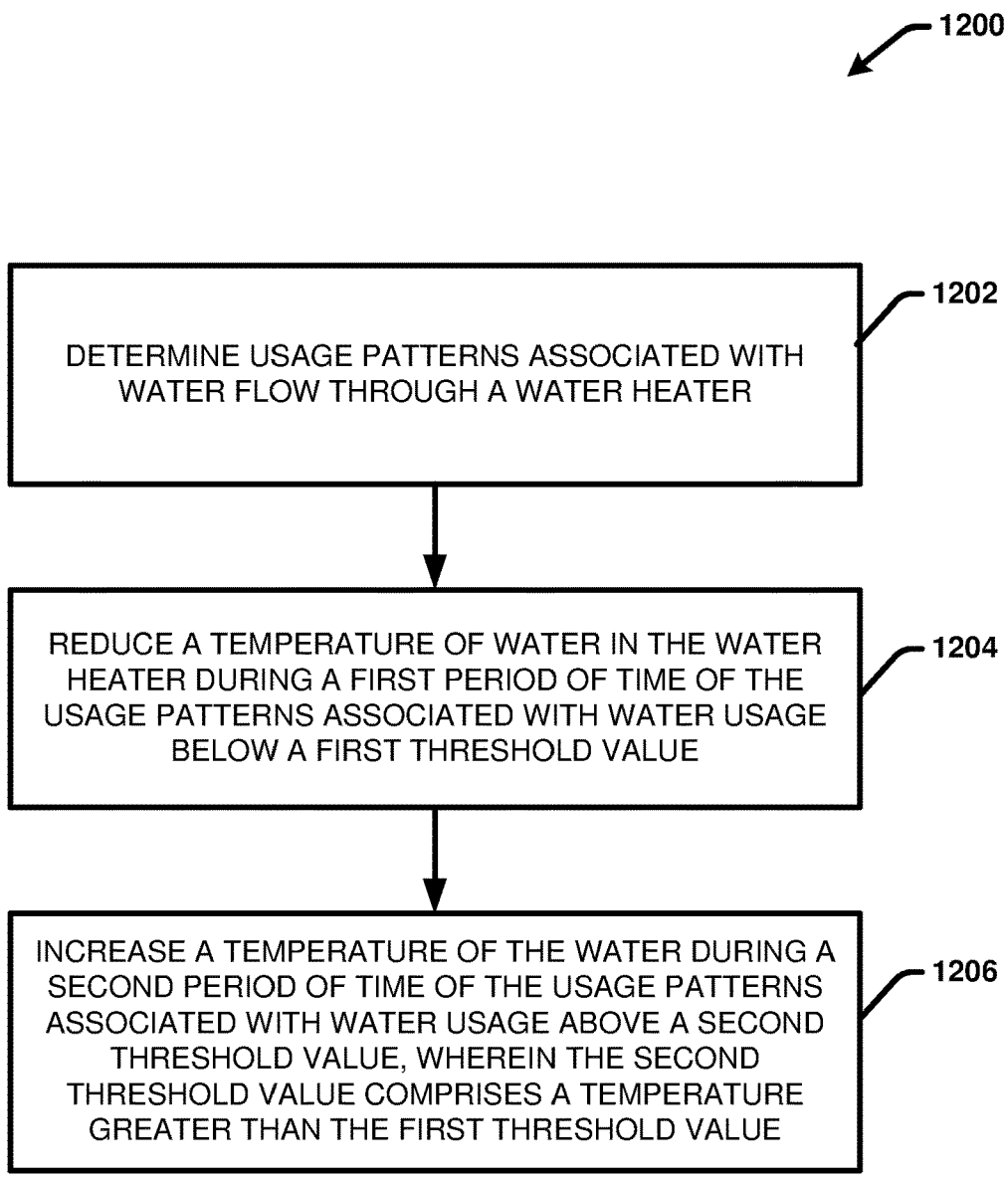
FIG. 12 is a block flow diagram for a process for a system that controls water temperature in accordance with one or more embodiments described herein.

Wirth reference to FIG. 12, a block flow diagram for a process for a system that regulates water temperature in accordance with one or more example embodiments is shown. At 1202, usage patterns associated with water flow through a water heater can be determined. At 1204, a temperature of water in the water heater during a first period of time of the usage patterns associated with water usage below a first threshold value can be reduced. At 1206, a temperature of the water during a second period of time of the usage patterns associated with water usage above a second threshold value, wherein the second threshold value comprises a temperature greater than the first threshold value, can be increased.

FIGS. 7-12 as described above illustrate respective methods or systems in accordance with certain aspects of this disclosure. While, for purposes of simplicity of explanation, the methods or systems are shown and described as a series of acts, it is to be understood and appreciated that this disclosure is not limited by the order of acts, as some acts may occur in different orders and/or concurrently with other acts from those shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 13:
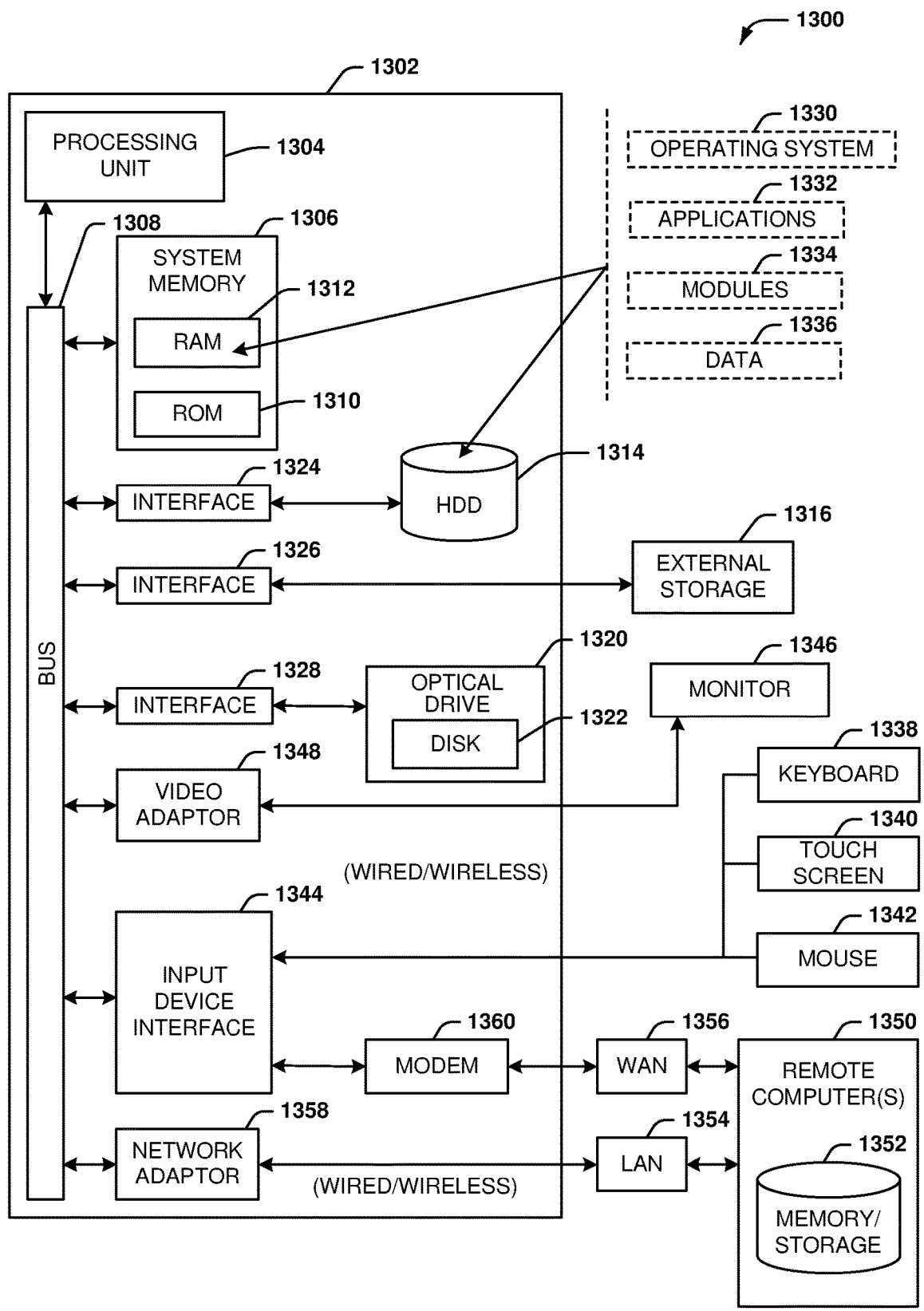
FIG. 13 is an example, non-limiting computing environment in which one or more example embodiments described herein can be implemented.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.) While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1694 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 14:
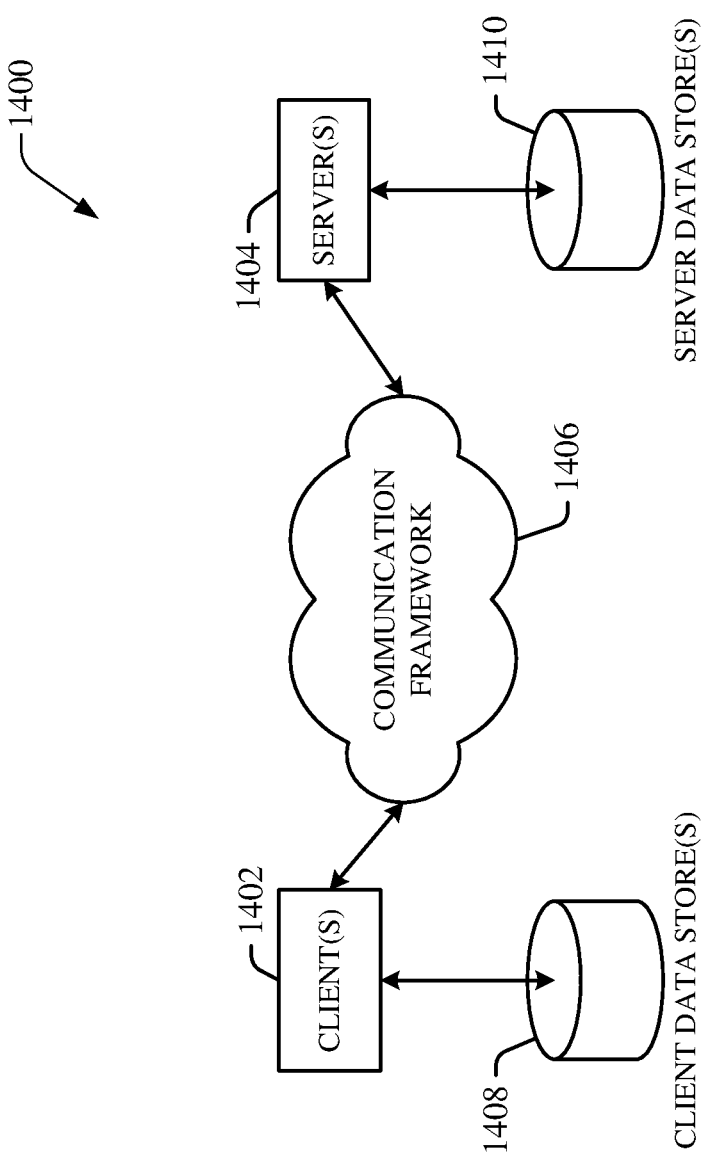
FIG. 14 is an example, non-limiting networking environment in which one or more example embodiments described herein can be implemented.

Referring now to FIG. 14, there is illustrated a schematic block diagram of a computing environment 1400 in accordance with this specification. The system 1400 includes one or more client(s) 1402, (e.g., computers, smartphones, tablets, cameras, PDA's). The client(s) 1402 can be hardware and/or software (e.g., threads, processes, computing devices). The client(s) 1402 can house cookie(s) and/or associated contextual information by employing the specification, for example.

The system 1400 also includes one or more server(s) 1404. The server(s) 1404 can also be hardware or hardware in combination with software (e.g., threads, processes, computing devices). The servers 1404 can house threads to perform transformations of media items by employing aspects of this disclosure, for example. One possible communication between a client 1402 and a server 1404 can be in the form of a data packet adapted to be transmitted between two or more computer processes wherein data packets may include coded analyzed headspaces and/or input. The data packet can include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

In one exemplary implementation, a client 1402 can transfer an encoded file, (e.g., encoded media item), to server 1404. Server 1404 can store the file, decode the file, or transmit the file to another client 1402. It is to be appreciated, that a client 1402 can also transfer uncompressed file to a server 1404 and server 1404 can compress the file and/or transform the file in accordance with this disclosure. Likewise, server 1404 can encode information and transmit the information via communication framework 1406 to one or more clients 1402.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor that executes computer executable components stored in a memory;
a mounting component configured to externally attach to a thermostat of a water heater, wherein the mounting component is secured to the thermostat without modifying internal components of the thermostat or water heater and couples the system to the thermostat;
an adapter component configured to engage with a temperature adjustor of the thermostat, wherein the adapter component applies physical force to manipulate the temperature adjustor;
a learning component that receives inputs from an at least one user regarding respective water needs and aggregates the inputs to create a heating plan; and
a configuration component of the computer executable components, that, based on the heating plan, when enabled by the processor, causes the adapter component to move the temperature adjustor to effect a temperature change at the thermostat.

2. The system of claim 1, wherein the input pertains to a desired water temperature.

3. The system of claim 2, wherein the input further comprises an amount of water needed.

4. The system of claim 1, wherein the learning component is an artificial intelligence component.

5. The system of claim 4, wherein the artificial intelligence component learns usage habits of the water heater.

6. The system of claim 5, wherein the habits comprise times of a day when water from the water heater is consumed and times of the day when water from the water heater is not consumed.

7. The system of claim 1, wherein the computer executable components comprise a communication component.

8. The system of claim 1, wherein the learning component further detects a quantity of water required for an at least one setting of an at least one appliance.

9. A computer program product that facilitates operations of a retrofit adapter for a thermostat-controlled water heater, the computer program product comprising readable storage medium having program instructions embodied therewith, the program instructions executable by a processor to cause the processor to:
receive inputs from a plurality of users regarding their respective water needs;
aggregate the inputs to create a heating plan;
enable an adapter component externally attached to a thermostat of the water heater to mechanically adjust a temperature adjuster of the thermostat without modifying internal components of the thermostat or water heater;
reduce a temperature of water in a water heater during a first period of time of the heating plan associated with water usage below a first threshold value; and
increase a temperature of the water during a second period of time of the heating plan associated with water usage above a second threshold value, wherein the second threshold value comprises a temperature greater than the first threshold value.

10. The computer program product of claim 9, wherein the program instructions further cause the processor to:
employ machine learning and artificial intelligence to determine relevance of the user inputs.

11. The computer program product of claim 9, wherein the program instructions further cause the processor to:
determine usage metrics associated with the individual user of a group of users of an at least one appliance.

12. The computer program product of claim 11, wherein the program instructions further cause the processor to:
generate a signal associated with the usage metrics; and
send the signal a recipient registered with the temperature controller device.

13. The computer program product of claim 11, wherein the at least one appliance comprises a dishwasher or a washing machine.

14. The computer program product of claim 9, wherein the program instructions further cause the processor to:
determine energy consumption associated with the at least one setting of the at least one appliance.

15. The computer program product of claim 14, wherein the at least one setting of the at least one appliance comprises a delayed start for a washer or dishwasher.

16. The computer program product of claim 15, further comprising:
maintaining a lower water temperature until immediately before the washer or dishwasher requires hot water to operate correctly.

* * * * *